United States Patent
Wang et al.

(10) Patent No.: US 12,047,174 B2
(45) Date of Patent: Jul. 23, 2024

(54) SIGNAL TRANSMISSION METHOD AND COMMUNICATIONS APPARATUS

(71) Applicant: Huawei Technologies Co., Ltd., Shenzhen (CN)

(72) Inventors: Yu Wang, Hangzhou (CN); Jianwei Zhou, Hangzhou (CN); Yunfei Qiao, Hangzhou (CN); Hejia Luo, Hangzhou (CN); Rong Li, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/078,810

(22) Filed: Dec. 9, 2022

(65) Prior Publication Data

US 2023/0123363 A1    Apr. 20, 2023

Related U.S. Application Data

(63) Continuation of application No. PCT/CN2021/097886, filed on Jun. 2, 2021.

(30) Foreign Application Priority Data

Jun. 11, 2020    (CN) .......................... 202010530482.7

(51) Int. Cl.
*H04L 1/1607* (2023.01)
*H04L 5/00* (2006.01)

(52) U.S. Cl.
CPC ............ *H04L 1/1621* (2013.01); *H04L 5/005* (2013.01)

(58) Field of Classification Search
CPC ..... H04L 5/005; H04L 1/1621; H04B 7/1853; H04B 7/18563; H04B 7/18523; H04B 7/18532; H04W 56/0015
USPC .................................................. 714/748–750
See application file for complete search history.

(56) References Cited

U.S. PATENT DOCUMENTS

| | | | | |
|---|---|---|---|---|
| 5,636,123 A | * | 6/1997 | Rich ..................... | G08G 5/0052 370/320 |
| 2005/0285780 A1 | * | 12/2005 | Murphy .................. | G01S 19/39 455/13.1 |
| 2009/0011761 A1 | * | 1/2009 | Han ...................... | H04J 11/0069 455/434 |

(Continued)

OTHER PUBLICATIONS

Fernandez, Francisco Amarillo, "Inter-satellite ranging and inter-satellite communication links for enhancing GNSS satellite broadcast navigation data," Advances in Space Research, Oct. 2010, 16 pages, vol. 47, No. 5, Elsevier.

(Continued)

*Primary Examiner* — Albert Decady
*Assistant Examiner* — Osman M Alshack
(74) *Attorney, Agent, or Firm* — Slater Matsil, LLP

(57) ABSTRACT

This application provides a signal transmission method and an apparatus. A network device broadcasts a navigation reference signal and a communication signal. A terminal device may determine its position information based on the navigation reference signal. A communication sequence in the communication signal and a navigation sequence in the navigation reference signal are coupled by using a same even-number-stage m-sequence, so that the terminal device is supported in completing an integrated communication and navigation function based on the broadcast signal.

20 Claims, 10 Drawing Sheets

(56) References Cited

U.S. PATENT DOCUMENTS

| | | | |
|---|---|---|---|
| 2012/0027110 A1* | 2/2012 | Han | H04L 5/0053 |
| | | | 375/260 |
| 2014/0354473 A1* | 12/2014 | Wallner | G01S 19/13 |
| | | | 342/357.51 |
| 2017/0070312 A1* | 3/2017 | Yi | H04W 72/541 |
| 2017/0078998 A1* | 3/2017 | Li | H04W 56/00 |
| 2019/0123874 A1* | 4/2019 | Liu | H04L 5/0048 |
| 2019/0268866 A1* | 8/2019 | Qu | H04J 11/00 |
| 2020/0014483 A1* | 1/2020 | Lee | H04L 27/2614 |
| 2021/0144659 A1* | 5/2021 | Wu | H04L 27/26025 |
| 2021/0368460 A1* | 11/2021 | Fakoorian | H04W 56/001 |

OTHER PUBLICATIONS

Yang, Chung et al., "Self-Calibrating Position Location Using Signals of Opportunity," Proc. ION GNSS, Jan. 2009, 10 pages.

* cited by examiner

SIGNAL TRANSMISSION METHOD AND COMMUNICATIONS APPARATUS

CROSS-REFERENCE TO RELATED APPLICATIONS

This application is a continuation of International Application No. PCT/CN2021/097886, filed on Jun. 2, 2021, which claims priority to Chinese Patent Application No. 202010530482.7, filed on Jun. 11, 2020. The disclosures of the aforementioned applications are hereby incorporated by reference in their entireties.

TECHNICAL FIELD

This application relates to a satellite network, and more specifically, to a signal transmission method and a communications apparatus.

BACKGROUND

A non-terrestrial network (NTN) such as satellite communication has significant advantages such as global coverage, long-distance transmission, flexible networking, convenient deployment, and no limitation from a geographical condition, and has been widely applied to a plurality of fields such as maritime communication, positioning and navigation, disaster relief, a scientific experiment, video broadcasting, and earth observation. A terrestrial network, a satellite network, and the like are integrated, to gather strengths and overcome a weakness, jointly form a sea-land-air-space-ground integrated communications network of global seamless coverage, and meet ubiquitous service requirements of a user.

A next-generation satellite network generally has a trend of being ultra dense and heterogeneous. First, a scale of the satellite network develops from 66 satellites in an Iridium satellite constellation to 720 satellites in a Oneweb satellite constellation, and finally develops to 12000+ satellites in a Starlink ultra dense low-orbit satellite constellation. Second, the satellite network has a heterogeneous characteristic, and develops from a conventional single-layer communications network to a multi-layer communications network. A communications satellite network tends to have complex and diversified functions, and is gradually compatible with and supports navigation enhancement, earth observation, on-orbit processing of multi-dimensional information, or the like.

Integrated communication and navigation (ICaN) is a potential development direction of a next-generation communication network (including the satellite network and the terrestrial network). In ICaN, advantages of communication and navigation are complementary. A terminal device obtains position information of the terminal device through passive positioning, to greatly simplify a position management function of a dynamic network (especially the satellite network).

However, an existing synchronous signal block (synchronization signal and PBCH block, SSB) broadcast signal is mainly designed for a communication network, and is inapplicable to a next-generation integrated communication and navigation satellite network. In addition, an existing cellular independent positioning technology depends on a specific reference signal to an extent, for example, a positioning reference signal (PRS). A Gold sequence whose length is 31 is used for the PRS, security is poor, a cross-correlation between sequences is suboptimal, a quantity of PRS sequences is limited, there are a maximum of 32 PRS sequences, and the PRS sequence is inapplicable to a large-scale satellite network.

SUMMARY

This application provides a signal transmission method, which can be applied to a next-generation integrated communication and navigation satellite network.

According to a first aspect, a method for designing a broadcast signal is provided. The method includes: obtaining a first sequence, where the first sequence is an n-stage m-sequence, and n is a positive even number; performing cyclic sampling every first interval starting from any position in the first sequence, to obtain a second sequence, where the second sequence is an n/2-stage m-sequence; performing a cyclic shift on the second sequence, to obtain a sequence of a primary synchronization signal; performing cyclic sampling every second interval starting from any position in the first sequence, to obtain a third sequence, where the third sequence is an n-stage m-sequence; determining a Kasami sequence based on the first sequence and the third sequence; determining a sequence of a navigation signal based on the Kasami sequence; and determining the broadcast signal, where the broadcast signal includes the primary synchronization signal and the navigation signal.

In the technical solution, a method for designing a sequence of a broadcast signal of an ICaN system is provided. A terminal device may be supported to complete a navigation/positioning function based on an instruction broadcast signal, to complete network self-positioning without a need to be supported by a global navigation satellite system (GNSS), and resolve a next-generation satellite dynamic networking problem. In addition, a navigation sequence is designed by using the Kasami sequence, there is a large quantity of sequences, an ultra dense satellite communications system is supported to broadcast the navigation signal, positioning performance is improved, and there is a good cross-correlation. In addition, the sequence of the navigation signal and a sequence of a communication signal are designed to be coupled, to facilitate error detection and secure communication.

With reference to the first aspect, in some implementations of the first aspect, the first interval is $2^{(n/2)}+1$, and the second interval is $2^{(n/2+1)}+1$.

With reference to the first aspect, in some implementations of the first aspect, the determining a Kasami sequence based on the first sequence and the third sequence includes: performing a modulo 2 addition operation on the first sequence, the second sequence, and the third sequence, to obtain a first Kasami sequence; and the determining a sequence of a navigation signal based on the Kasami sequence includes: determining the sequence of the navigation signal based on the first Kasami sequence or a truncated sequence of the first Kasami sequence.

In the technical solution, the navigation sequence is designed by using the Kasami sequence, there is a large quantity of sequences, the ultra dense satellite communications system is supported to broadcast the navigation signal, positioning performance is improved, and there is a good cross-correlation.

With reference to the first aspect, in some implementations of the first aspect, the determining a Kasami sequence based on the first sequence and the third sequence includes: performing a modulo 2 addition operation on the first sequence and the third sequence, to obtain a second Kasami sequence; and the determining a sequence of a navigation signal based on the Kasami sequence includes: determining the sequence of the navigation signal based on the second Kasami sequence or a truncated sequence of the second Kasami sequence.

In the technical solution, the navigation sequence is designed by using the Kasami sequence, there is a large quantity of sequences, the ultra dense satellite communications system is supported to broadcast the navigation signal, positioning performance is improved, and there is a good cross-correlation.

With reference to the first aspect, in some implementations of the first aspect, the obtaining a first sequence includes: obtaining the first sequence based on a primitive polynomial of the first sequence and an initial state of a shift register that generates the first sequence.

With reference to the first aspect, in some implementations of the first aspect, the method includes: determining a fourth sequence based on the second sequence, where the fourth sequence is a Gold sequence; and performing a cyclic shift on the fourth sequence, to obtain a sequence of a secondary synchronization signal, where the broadcast signal includes the secondary synchronization signal.

With reference to the first aspect, in some implementations of the first aspect, the determining a fourth sequence based on the second sequence, where the fourth sequence is a Gold sequence includes: determining a primitive polynomial of the second sequence based on the second sequence; determining a primitive polynomial of a fifth sequence based on the primitive polynomial of the second sequence, where the fifth sequence and the second sequence are a preferred pair of sequences that can form the Gold sequence; determining the fifth sequence based on the primitive polynomial of the fifth sequence and an initial state of a shift register that generates the fifth sequence; and determining the fourth sequence based on the second sequence and the fifth sequence.

With reference to the first aspect, in some implementations of the first aspect, when n=14, the primitive polynomial of the first sequence is $f(x)=1+x^8+x^2+x^{10}+x^{11}+x^{13}+x^{14}$, the initial state of the shift register that generates the first sequence is (1, 1, 1, 1, 1, 1, 1, 1, 1, 1, 1, 1, 1, 1), the primitive polynomial of the second sequence is $f_1(x)=1+x^4+x^7$, the primitive polynomial of the fifth sequence is $f_2(x)=1+x+x^7$, and the initial state of the shift register that generates the fifth sequence is (0, 0, 0, 0, 0, 0, 1).

In the technical solution, when an existing NR protocol communication broadcast signal is not changed, navigation and positioning performance is improved, and an ultra dense satellite network of 10000+ satellites can be supported.

With reference to the first aspect, in some implementations of the first aspect, when n=14, the primitive polynomial of the first sequence is $f(x)=1+x+x^3+x^5+x^{14}$, an initial state of a shift register that generates a 14-stage m-sequence is (1, 1, 1, 1, 1, 1, 1, 1, 1, 1, 1, 1, 1, 1), the primitive polynomial of the second sequence is $f_1(x)=1+x^6+x^7$, a primitive polynomial of the third sequence is $f_2(x)=1+x^3+x^7$, and an initial state of a shift register that generates the third sequence is (0, 0, 0, 0, 0, 0, 1).

In the technical solution, navigation and positioning performance is improved, and an ultra dense satellite network of more than 10000+ satellites can be supported.

According to a second aspect, a signal transmission method is provided. The method includes: A network device broadcasts a navigation reference signal and a communication signal. The navigation reference signal includes a navigation sequence, the navigation sequence is a Kasami sequence determined based on a first sequence and a third sequence, the communication signal includes a primary synchronization signal, and the primary synchronization signal is a sequence determined after a cyclic shift is performed on a second sequence. The first sequence is an n-stage m-sequence, n is a positive even number, the second sequence is an n/2-stage m-sequence obtained by performing cyclic sampling every first interval starting from any position in the first sequence, the third sequence is an n-stage m-sequence obtained by performing cyclic sampling every second interval starting from any position in the first sequence, and the navigation reference signal is used by a communications apparatus to determine position information of the communications apparatus. In the technical solution of this application, the network device broadcasts a broadcast signal of an ICaN system, a terminal device may complete a navigation/positioning function based on an instruction broadcast signal, to complete network self-positioning without a need to be supported by a GNSS, and resolve a next-generation satellite dynamic networking problem. In addition, the navigation sequence is designed by using the Kasami sequence, there is a large quantity of sequences, an ultra dense satellite communications system is supported to broadcast the navigation signal, positioning performance is improved, and there is a good cross-correlation. In addition, a sequence of the navigation signal and a sequence of the communication signal are designed to be coupled, to facilitate error detection and secure communication.

With reference to the second aspect, in some implementations of the second aspect, the first interval is $2^{(n/2)}+1$, and the second interval is $2^{(n/2+1)}+1$.

With reference to the second aspect, in some implementations of the second aspect, that the navigation sequence is a Kasami sequence determined based on the first sequence and the third sequence includes: the navigation sequence is a first Kasami sequence obtained by performing a modulo 2 addition operation on the first sequence, the second sequence, and the third sequence or a truncated sequence of the first Kasami sequence.

In the technical solution, the navigation sequence is designed by using the Kasami sequence, there is a large quantity of sequences, the ultra dense satellite communications system is supported to broadcast the navigation signal, positioning performance is improved, and there is a good cross-correlation.

With reference to the second aspect, in some implementations of the second aspect, that the navigation sequence is a Kasami sequence determined based on the first sequence and the third sequence includes: the navigation sequence is a second Kasami sequence obtained by performing a modulo 2 addition operation on the first sequence and the third sequence or a truncated sequence of the second Kasami sequence.

In the technical solution, the navigation sequence is designed by using the Kasami sequence, there is a large quantity of sequences, the ultra dense satellite communications system is supported to broadcast the navigation signal, positioning performance is improved, and there is a good cross-correlation.

With reference to the second aspect, in some implementations of the second aspect, the first sequence is a sequence determined based on a primitive polynomial of the first sequence and an initial state of a shift register that generates the first sequence.

With reference to the second aspect, in some implementations of the second aspect, the communication signal includes a secondary synchronization signal, the secondary synchronization signal is a sequence determined after a cyclic shift is performed on a fourth sequence, and the fourth sequence is a Gold sequence determined based on the second sequence.

With reference to the second aspect, in some implementations of the second aspect, that the fourth sequence is a Gold sequence determined based on the second sequence includes: the fourth sequence is a Gold sequence determined based on the second sequence and a fifth sequence. The fifth sequence and the second sequence are a preferred pair of sequences that can form a Gold sequence, the fifth sequence is determined based on a primitive polynomial of the fifth sequence and an initial state of a shift register that generates the fifth sequence, and the primitive polynomial of the fifth sequence is determined based on a primitive polynomial of the second sequence.

With reference to the second aspect, in some implementations of the second aspect, when n=14, the primitive polynomial of the first sequence is $f(x)=1+x^8+x^9+x^{10}+x^{11}+x^{13}+x^{14}$, the initial state of the shift register that generates the first sequence is (1, 1, 1, 1, 1, 1, 1, 1, 1, 1, 1, 1, 1, 1), the primitive polynomial of the second sequence is $f_1(x)=1+x_4+x^7$, the primitive polynomial of the fifth sequence is $f_2(x)=1+x+x^7$, and the initial state of the shift register that generates the fifth sequence is (0, 0, 0, 0, 0, 0, 1).

In the technical solution, when an existing NR protocol communication broadcast signal is not changed, navigation and positioning performance is improved, and an ultra dense satellite network of 10000+ satellites can be supported.

With reference to the second aspect, in some implementations of the second aspect, when n=14, the primitive polynomial of the first sequence is $f(x)=1+x+x^3+x^5+x^{14}$, an initial state of a shift register that generates the 14-stage m-sequence is (1, 1, 1, 1, 1, 1, 1, 1, 1, 1, 1, 1, 1, 1), the primitive polynomial of the second sequence is $f_1(x)=1+x^6+x^7$, a primitive polynomial of the third sequence is $f_2(x)=1+x^3+x^7$, and an initial state of a shift register that generates the third sequence is (0, 0, 0, 0, 0, 0, 1).

In the technical solution, navigation and positioning performance is improved, and an ultra dense satellite network of more than 10000+ satellites can be supported.

With reference to the second aspect, in some implementations of the second aspect, the method further includes: The network device receives a positioning request sent by a terminal device. That a network device broadcasts a navigation reference signal includes: The network device periodically broadcasts the navigation reference signal on a first time-frequency resource based on the positioning request, where the first time-frequency resource is a fixed time-frequency resource; or the network device broadcasts, based on a requirement, the navigation reference signal on a second time-frequency resource based on the positioning request, where the second time-frequency resource is a configurable time-frequency resource.

In the technical solution, a time-frequency resource (namely, the second time-frequency resource) occupied to send the navigation reference signal may be flexibly configured. Compared with a periodic broadcast manner, in the technical solution, utilization of the time-frequency resource can be improved.

According to a third aspect, a signal transmission method is provided. The method includes: A communications apparatus receives a navigation reference signal and a communication signal that are of a plurality of cells and that are broadcast by a plurality of network devices. The navigation reference signal includes a navigation sequence, the navigation sequence is a Kasami sequence determined based on a first sequence and a third sequence, the communication signal includes a primary synchronization signal, and the primary synchronization signal is a sequence determined after a cyclic shift is performed on a second sequence. The first sequence is an n-stage m-sequence, n is a positive even number, the second sequence is an n/2-stage m-sequence obtained by performing cyclic sampling every first interval starting from any position in the first sequence, and the third sequence is an n-stage m-sequence obtained by performing cyclic sampling every second interval starting from any position in the first sequence. The communications apparatus determines position information of the communications apparatus based on a navigation sequence in a navigation reference signal of at least two of the plurality of cells.

With reference to the third aspect, in some implementations of the third aspect, the first interval is $2^{(n/2)}+1$, and the second interval is $2^{(n/2+1)}+1$.

With reference to the third aspect, in some implementations of the third aspect, that the navigation sequence is a Kasami sequence determined based on the first sequence and the third sequence includes: the navigation sequence is a first Kasami sequence obtained by performing a modulo 2 addition operation on the first sequence, the second sequence, and the third sequence or a truncated sequence of the first Kasami sequence.

With reference to the third aspect, in some implementations of the third aspect, that the navigation sequence is a Kasami sequence determined based on the first sequence and the third sequence includes: the navigation sequence is a second Kasami sequence obtained by performing a modulo 2 addition operation on the first sequence and the third sequence or a truncated sequence of the second Kasami sequence.

With reference to the third aspect, in some implementations of the third aspect, the first sequence is a sequence determined based on a primitive polynomial of the first sequence and an initial state of a shift register that generates the first sequence.

With reference to the third aspect, in some implementations of the third aspect, the communication signal includes a secondary synchronization signal, the secondary synchronization signal is a sequence determined after a cyclic shift is performed on a fourth sequence, and the fourth sequence is a Gold sequence determined based on the second sequence.

With reference to the third aspect, in some implementations of the third aspect, that the fourth sequence is a Gold sequence determined based on the second sequence includes: the fourth sequence is a Gold sequence determined based on the second sequence and a fifth sequence. The fifth sequence and the second sequence are a preferred pair of sequences that can form a Gold sequence, the fifth sequence is determined based on a primitive polynomial of the fifth sequence and an initial state of a shift register that generates the fifth sequence, and the primitive polynomial of the fifth sequence is determined based on a primitive polynomial of the second sequence.

With reference to the third aspect, in some implementations of the third aspect, when n=14, the primitive polynomial of the first sequence is $f(x)=1+x^8+x^9+x^{10}+x^{11}+x^{13}+x^{14}$, the initial state of the shift register that generates the first sequence is (1, 1, 1, 1, 1, 1, 1, 1, 1, 1, 1, 1, 1, 1), the primitive polynomial of the second sequence is $f_1(x)=1+x^4+x^7$, the primitive polynomial of the fifth sequence is $f_2(x)=1+x+x^7$, and the initial state of the shift register that generates the fifth sequence is (0, 0, 0, 0, 0, 0, 1).

With reference to the third aspect, in some implementations of the third aspect, when n=14, the primitive polynomial of the first sequence is $f(x)=1+x+x^3+x^5+x^{14}$, an initial state of a shift register that generates the 14-stage m-sequence is (1, 1, 1, 1, 1, 1, 1, 1, 1, 1, 1, 1, 1, 1), the primitive polynomial of the second sequence is $f_1(x)=1+x^6+x^7$, a primitive polynomial of the third sequence is $f_2(x)=1+x^3+x^7$, and an initial state of a shift register that generates the third sequence is (0, 0, 0, 0, 0, 0, 1).

With reference to the third aspect, in some implementations of the third aspect, a terminal device sends a positioning request to the plurality of network devices; and that the terminal device receives a navigation reference signal and a communication signal that are of a plurality of cells and that are broadcast by a plurality of network devices includes: The terminal device periodically receives, on a first time-frequency resource, the navigation reference signal that is of the plurality of cells and that is sent by the plurality of network devices based on the positioning request, where the first time-frequency resource is a fixed time-frequency resource; or the terminal device receives, on a second time-frequency resource, the navigation reference signal that is of the plurality of cells and that is sent by the plurality of network devices based on the positioning request, where the second time-frequency resource is a configurable time-frequency resource.

For beneficial technical effects of the method in the third aspect or any implementation of the third aspect, refer to descriptions of a corresponding technical solution in the method in the second aspect or any implementation of the second aspect. Details are not described again.

According to a fourth aspect, a communications apparatus is provided. The communications apparatus has a function of implementing the method in the first aspect or any possible implementation of the first aspect. The function may be implemented by hardware, or may be implemented by hardware executing corresponding software. The hardware or the software includes one or more units corresponding to the foregoing function, for example, a processing unit.

According to a fifth aspect, this application provides a communications apparatus. The communications apparatus has a function of implementing the method in the second aspect or any possible implementation of the second aspect. The function may be implemented by hardware, or may be implemented by hardware executing corresponding software. The hardware or the software includes one or more units corresponding to the foregoing function, for example, a processing unit, a receiving unit, and a sending unit.

According to a sixth aspect, this application provides a communications apparatus. The communications apparatus has a function of implementing the method in the third aspect or any possible implementation of the third aspect. The function may be implemented by hardware, or may be implemented by hardware executing corresponding software. The hardware or the software includes one or more units corresponding to the foregoing function, for example, a processing unit, a receiving unit, and a sending unit.

According to a seventh aspect, this application provides a communications device, including at least one processor. The at least one processor is coupled to at least one memory, the at least one memory is configured to store a computer program or instructions, and the at least one processor is configured to invoke and run the computer program or instructions from the at least one memory, so that the communications device performs the method in the first aspect or any possible implementation of the first aspect.

According to an eighth aspect, this application provides a communications device, including at least one processor. The at least one processor is coupled to at least one memory, the at least one memory is configured to store a computer program or instructions, and the at least one processor is configured to invoke and run the computer program or instructions from the at least one memory, so that the communications device performs the method in the second aspect or any possible implementation of the second aspect.

In an example, the communications device may be a network device.

According to a ninth aspect, this application provides a communications device, including at least one processor. The at least one processor is coupled to at least one memory, the at least one memory is configured to store a computer program or instructions, and the at least one processor is configured to invoke and run the computer program or instructions from the at least one memory, so that the communications device performs the method in the second aspect or any possible implementation of the second aspect.

In an example, the communications device may be a terminal device.

According to a tenth aspect, this application provides a computer-readable storage medium. The computer-readable storage medium stores computer instructions. When the computer instructions run on a computer, the method in the first aspect or any possible implementation of the first aspect is performed.

According to an eleventh aspect, this application provides a computer-readable storage medium. The computer-readable storage medium stores computer instructions. When the computer instructions run on a computer, the method in the second aspect or any possible implementation of the second aspect is performed.

According to a twelfth aspect, this application provides a computer-readable storage medium. The computer-readable storage medium stores computer instructions. When the computer instructions run on a computer, the method in the third aspect or any possible implementation of the third aspect is performed.

According to a thirteenth aspect, this application provides a computer program product. The computer program product includes computer program code, and when the computer program code runs on a computer, the method in the first aspect or any possible implementation of the first aspect is performed.

According to a fourteenth aspect, this application provides a computer program product. The computer program product includes computer program code, and when the computer program code runs on a computer, the method in the second aspect or any possible implementation of the second aspect is performed.

According to a fifteenth aspect, this application provides a computer program product. The computer program product includes computer program code, and when the computer program code runs on a computer, the method in the third aspect or any possible implementation of the third aspect is performed.

According to a sixteenth aspect, this application provides a chip, including a processor and a communications interface. The communications interface is configured to receive a signal, and transmit the signal to the processor, and the processor processes the signal, so that the method in the first aspect or any possible implementation of the first aspect is performed.

According to a seventeenth aspect, this application provides a chip, including a processor and a communications interface. The communications interface is configured to receive a signal, and transmit the signal to the processor, and the processor processes the signal, so that the method in the second aspect or any possible implementation of the second aspect is performed.

According to an eighteenth aspect, this application provides a chip, including a processor and a communications interface. The communications interface is configured to receive a signal, and transmit the signal to the processor, and the processor processes the signal, so that the method in the third aspect or any possible implementation of the third aspect is performed.

According to a nineteenth aspect, this application provides a wireless communications system, including the communications device in the eighth aspect and the ninth aspect.

DETAILED DESCRIPTION OF ILLUSTRATIVE EMBODIMENTS

The following describes technical solutions of this application with reference to the accompanying drawings.

The technical solutions of this application may be applied to a non-terrestrial network (NTN) system such as a satellite communications system and a high altitude platform station (HAPS) communications system, for example, an ICaN system and a global navigation satellite system (GNSS).

The satellite communications system may be integrated with a conventional mobile communications system. For example, the mobile communications system may be a 4th generation (4G) communications system (for example, a long term evolution (LTE) system), a worldwide interoperability for microwave access (WiMAX) communications system, a 5th generation (5G) communications system (for example, a new radio (NR) system), and a future mobile communications system.

Figure 1:
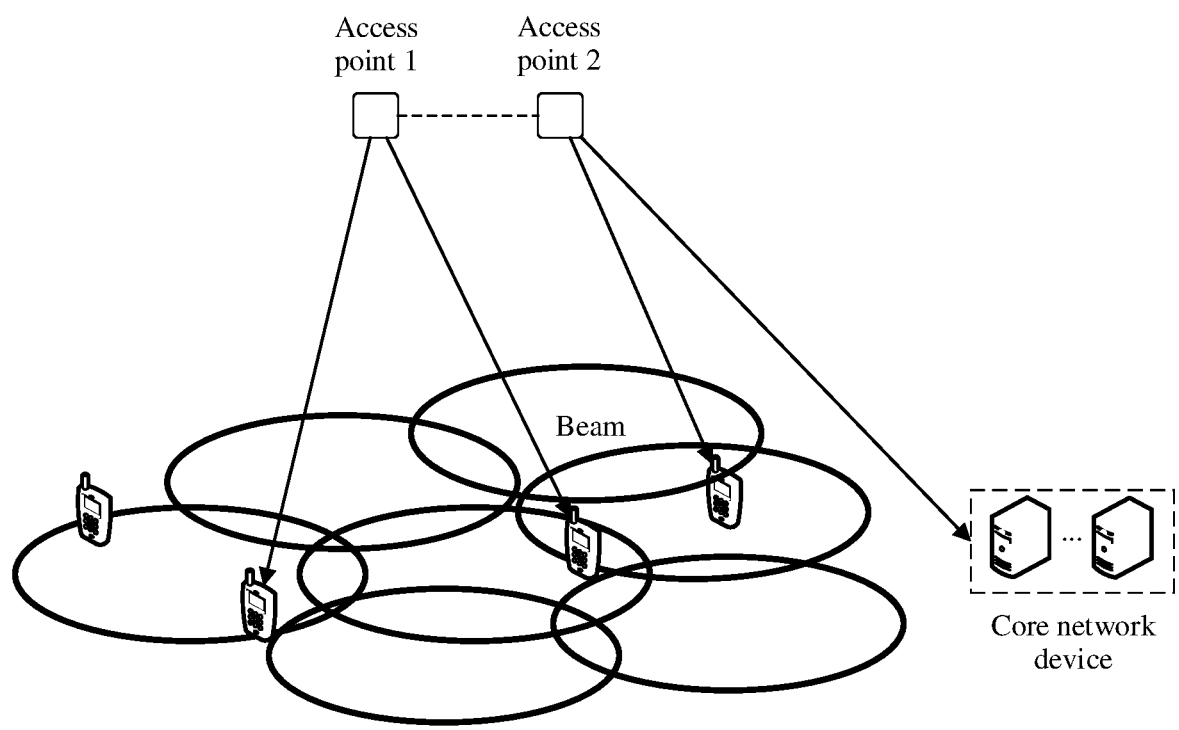
FIG. 1 is an example of a communications system applicable to embodiments of this application.

FIG. 1 is an example of a communications system applicable to an embodiment of this application. As shown in FIG. 1, an access point covers a service area by using a plurality of beams, and different beams may be used to perform communication through one or more of time division, frequency division, and space division. The access point broadcasts a communication signal and a navigation signal to provide a terminal device with a communication and navigation service, and the access point accesses a core network device. The access point is not limited to a satellite base station or a ground base station. The access point may be deployed on a high altitude platform or a satellite. The satellite may be a non-geostationary earth orbit (NGEO) satellite or a geostationary earth orbit (GEO) satellite.

The access point may be an evolved NodeB (eNB or eNodeB) in LTE, a base station in a 5G network or a future evolved public land mobile network (PLMN), a broadband network gateway (BNG), an aggregation switch, a non-3rd generation partnership project (3GPP) access device, or the like. This is not specifically limited in this embodiment of this application. Optionally, the base station in this embodiment of this application may include various forms of base stations, for example, a macro base station, a micro base station (also referred to as a small cell), a relay station, an access point, a next-generation base station (gNodeB, gNB), a baseband unit (BBU), a transmission and reception point (transmitting and receiving point, TRP), a transmitting point (TP), and a mobile switching center. This is not specifically limited in this embodiment of this application. The satellite in this embodiment of this application may alternatively be a satellite base station, or a network side device mounted on the satellite.

The terminal device in this embodiment of this application includes various handheld devices, vehicle-mounted devices, wearable devices, computing devices, or other processing devices that have a wireless communication function, and may be specifically user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a satellite phone, a cellular phone, a smartphone, a wireless data card, a wireless modem, a machine type communications device, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device or wearable device, a virtual reality (VR) terminal device, an augmented reality (AR) terminal device, a wireless terminal in industrial control, a wireless terminal in self driving, a wireless terminal in telemedicine (remote medical), a wireless terminal in smart grid, a wireless terminal in transportation safety, a wireless terminal in a smart city, a wireless terminal in a smart home, a terminal device in a 5G network or a future communications network, or the like.

In addition, the access point and the core network device are mentioned in FIG. 1. Unless specifically specified, each network device in the following embodiments is an access point (or an access network device), for example, a satellite base station.

To facilitate understanding embodiments of this application, terms used in this application are first briefly described.

1. An m-sequence is short for a longest linear shift register sequence. The m-sequence may be generated by a binary linear feedback shift register, and the binary linear feedback shift register mainly includes n registers connected in series, a shift pulse generator, and a modulo-2 adder. A state of an $i^{th}$ (0≤i≤n-1)-stage shift register is represented by using $\alpha_i$ where $\alpha_i$=0 or 1. A connecting state of a feedback line is represented by using $c_i$, $c_i$=1 indicates that the line is connected (provides feedback), and $c_i$=0 indicates that the line is disconnected. In a binary shift register, if n (n≥2) is a quantity of stages of the shift register, an n-stage shift register has a total of $2^n$ states, and there are $2^n-1$ states other than an all-zero state. Therefore, a code sequence that has a maximum length and that can be generated by the n-stage shift register includes $2^n-1$ bits.

2. A Gold sequence is a pseudo-random sequence that has a better characteristic and that is provided based on an m-sequence. The Gold sequence is formed by performing modulo 2 addition on a preferred pair of two m-sequences that have an equal code length and a same code clock rate.

3. A Kasami sequence is a spread spectrum sequence constructed based on an m-sequence. The Kasami sequence is a new sequence constructed by performing modulo 2 addition on the m-sequence and a sequence obtained after different sampling is performed on the m-sequence. The Kasami sequence includes a Kasami large set sequence and a Kasami small set sequence.

4. Cyclic shift: The cyclic shift is a process in which a value is converted into a binary value and then the cyclic shift is performed. The cyclic shift is to shift a lower bit to a higher bit of a number (rightward cyclic shift) or shift a higher bit to a lower bit of a number (leftward cyclic shift). Leftward shift and rightward shift each are an operation performed on an integer.

Figure 2:
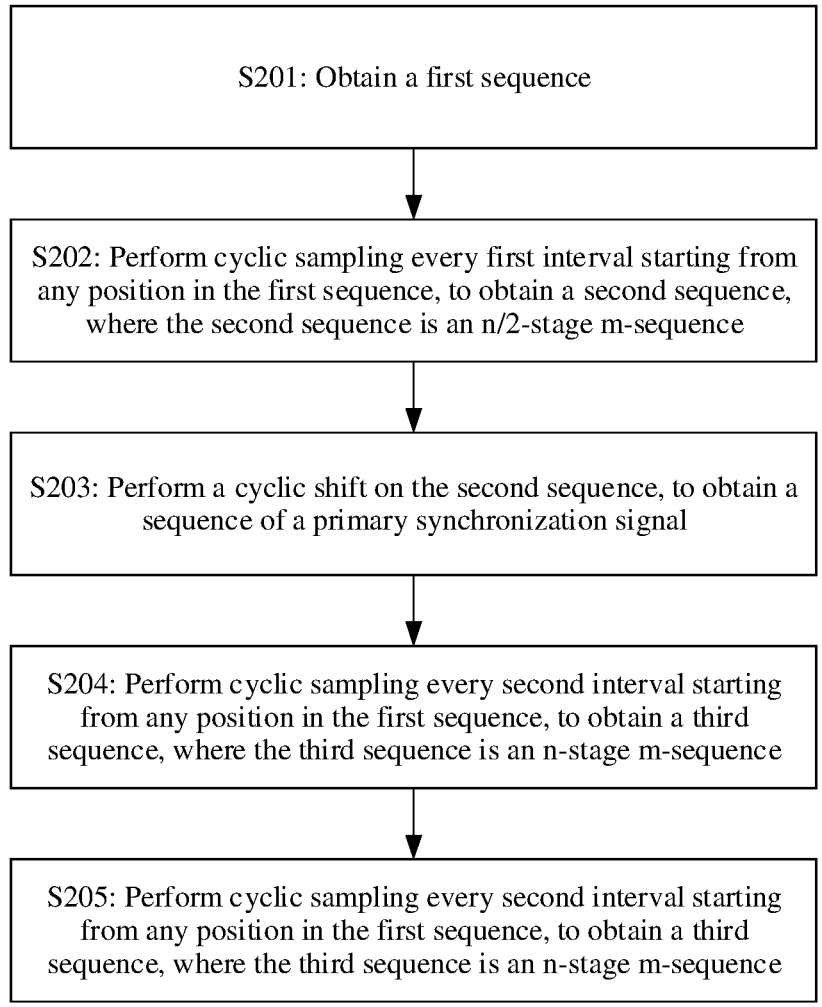
FIG. 2 is a schematic block diagram of a method for designing a broadcast signal according to an embodiment of this application.

FIG. 2 is a schematic block diagram of a method for designing a broadcast signal according to this application. The broadcast signal includes a communication signal and a navigation signal. The communication signal includes a primary synchronization signal (SS).

S201: Obtain a first sequence.

The first sequence is an n-stage m-sequence, and n is a positive even number. For example, n=2, 8, 10, or 14.

Optionally, a specific n-stage m-sequence may be directly given, and a length of the m-sequence is $2^n-1$.

Optionally, the first sequence may be obtained based on a primitive polynomial and an initial state of a shift register that generates the first sequence. In this application, different first sequences may be generated based on different primitive polynomials and different initial states. For example, a specific 14-stage m-sequence may be determined based on a primitive polynomial $f(x)=1+x^8+x^9+x^{10}+x^{11}+x^{13}+x^{14}$ and an initial state (1, 1, 1, 1, 1, 1, 1, 1, 1, 1, 1, 1, 1, 1) of a shift register corresponding to the primitive polynomial, and a length of the m-sequence is $2^{14}-1$ (namely, 16384-1).

S202: Perform cyclic sampling every first interval starting from any position in the first sequence, to obtain a second sequence, where the second sequence is an n/2-stage m-sequence.

It should be understood that the any position herein may be a first bit, a second bit, a fifth bit, or another position in the first sequence.

Optionally, the first interval may be $2^{(n/2)}+1$, or may be another sampling interval, and it only needs to meet a condition that the second sequence obtained after sampling is an n/2-stage m-sequence.

S203: Perform a cyclic shift on the second sequence, to obtain a sequence of the primary synchronization signal.

Optionally, the communication signal further includes a secondary synchronization signal. For example, a sequence of the secondary synchronization signal may be implemented in the following method:

(1) Determine a primitive polynomial of the second sequence based on the second sequence obtained after sampling.

(2) Determine a primitive polynomial A based on the primitive polynomial of the second sequence by searching a table, and determine a fifth sequence based on the primitive polynomial A and an initial state of a shift register that generates the fifth sequence, where the fifth sequence and the second sequence are a preferred pair of sequences that can form a Gold sequence.

It should be understood that there may be a plurality of fifth sequences that can form the Gold sequence with the second sequence. In other words, a plurality of primitive polynomials A may be used to form a preferred pair with the second sequence. In an actual application, a proper primitive polynomial A may be selected based on a specific condition. This is not limited in this application.

(3) Determine a fourth sequence based on the second sequence and the fifth sequence, where the fourth sequence is an n/2-stage Gold sequence.

(4) Perform a cyclic shift on the fourth sequence, to obtain the sequence of the secondary synchronization signal.

S204: Perform cyclic sampling every second interval starting from any position in the first sequence, to obtain a third sequence, where the third sequence is an n-stage m-sequence.

It should be understood that the any position herein may be a first bit, a second bit, a fifth bit, or another position in the first sequence.

Optionally, the second interval may be $2^{(n/2+1)}+1$, or may be another sampling interval, and it only needs to meet a condition that the third sequence obtained after sampling is an n-stage m-sequence.

S205: Determine a Kasami sequence based on the first sequence and the third sequence, and determine a navigation sequence based on the Kasami sequence.

In an implementation, a modulo 2 addition operation is performed on the first sequence, the second sequence, and the third sequence, to obtain a Kasami large set sequence (namely, a first Kasami sequence), and the Kasami large set sequence or a truncated sequence of the Kasami large set sequence is used as the navigation sequence.

In another implementation, a modulo 2 addition operation is performed on the first sequence and the third sequence, to obtain a Kasami small set sequence (namely, a second Kasami sequence), and the Kasami small set sequence or a truncated sequence of the Kasami small set sequence is used as the navigation sequence.

Optionally, a length of the truncated sequence may be determined based on a quantity of satellites, positioning precision, or a clock frequency.

Optionally, the truncated sequence may be a continuous segment of sequence in the Kasami sequence (the Kasami large set sequence or the Kasami small set sequence), or may be used as a plurality of discontinuous segments of sequences in the Kasami sequence. For example, when the first sequence is a 14-stage m-sequence, a length of the Kasami sequence is 16383, and the truncated sequence may range from a $1^{st}$ bit to a 300th bit, from a $3000^{th}$ bit to a $5000^{th}$ bit, or from a $12000^{th}$ bit to a $13000^{th}$ bit in the Kasami sequence, or may be a combination of the $1^{st}$ bit to the $300^{th}$ bit, the $3000^{th}$ bit to the $5000^{th}$ bit, or the $12000^{th}$ bit to the $13000^{th}$ bit. This is not specifically limited in this application.

In the technical solution, a method for designing a sequence of a broadcast signal of an ICaN system is provided. A terminal device may be supported to complete a navigation/positioning function based on an instruction broadcast signal, to complete network self-positioning without a need to be supported by a GNSS, and resolve a next-generation satellite dynamic networking problem. In addition, the navigation sequence is designed by using the Kasami sequence, there is a large quantity of sequences, an ultra dense satellite communications system is supported to broadcast the navigation signal, positioning performance is improved, and there is a good cross-correlation. In addition, a sequence of the navigation signal and a sequence of the communication signal are designed to be coupled, to facilitate error detection and secure communication.

In different communications systems, the broadcast signal may have different structures and names. For example, in an example, in NR, a broadcast signal block may be a synchronization signal block (synchronization signal and PBCH block, SSB). The SSB includes a primary synchronization signal (PSS), a secondary synchronization signal (SSS) signal, and/or the like.

A design of the communication signal in FIG. 2 includes but is not limited to the SSB in the existing NR. In an example, this application provides a sequence design method in which a primary SS is the same as a PSS and a secondary SS is the same as an SSS in ICaN.

Figure 3:
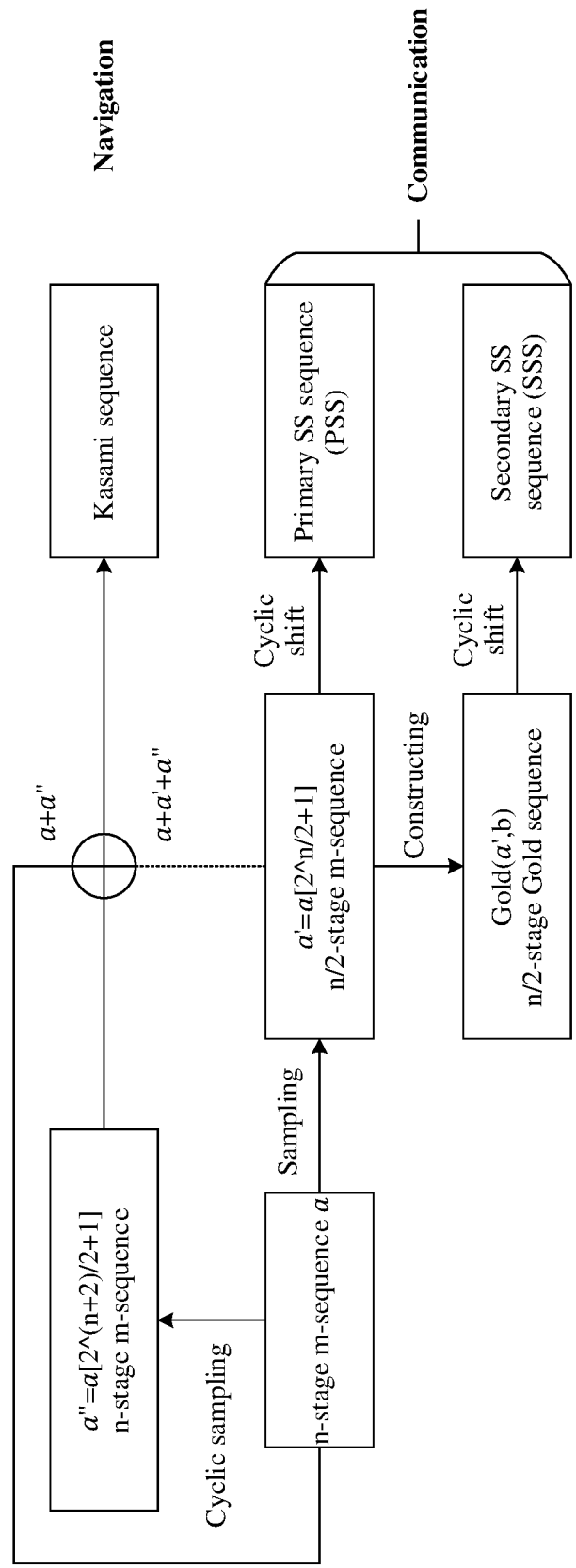
FIG. 3 is a flowchart of a method for designing a sequence of a broadcast signal according to an embodiment of this application.

FIG. 3 is a flowchart of a method for designing a broadcast signal according to this application. Specifically, a sequence generation step in which a primary SS is the same as a PSS and a secondary SS is the same as an SSS in ICaN is as follows:

(1) Generate a 14-stage m-sequence α (namely, an example of a first sequence, where a length is 16384-1), where a primitive polynomial of the sequence α is $f(x)=1+x^8+x^9+x^{10}+x^{11}+x^{13}+x^{14}$, and an initial state of a shift register that generates the sequence α is (1, 1, 1, 1, 1, 1, 1, 1, 1, 1, 1, 1, 1, 1).

It should be understood that $x^i$ in the primitive polynomial only indicates a value of a feedback coefficient $c_i$ ($c_i$=1 or 0) of $x^i$, a value of x is meaningless, and the value of x does not need to be calculated. For example, if the primitive polynomial is $f(x)=1+x+x^4$ it only indicates that feedback coefficients of $x^0$, $x^1$, and $x^4$ are $c_0=c_1=c_4=1$, and the other feedback coefficients are zero.

(2) Perform ($2^7$+1) cyclic sampling on the sequence α, to obtain a sequence α' (namely, an example of the second sequence) corresponding to the primary SS, and learn, through solving, that a primitive polynomial of the sequence α' is $f_1(x)=1+x^4+x^7$, where the primitive polynomial is the same as a PSS in NR.

In the following, this application provides a method for obtaining, through solving, a primitive polynomial of an m-sequence obtained after cyclic sampling, and specific steps include:

(a) Construct a sequence whose total length is 2n, where n is a quantity of stages of an m-sequence S, and a primitive polynomial of the sequence S is $$f_1(x)=1+C_1x_1+C_2x_2+\ldots+C_nx_n.$$

The sequence whose length is 2n is specifically as follows (where the $2^{nd}$ bit to an $n^{th}$ bit of the sequence are a continuous 0 sequence including n−1 bits):

$$1(a_{k-n}),0,0,0,\ldots,0,1(a_k),a_{k+1},a_{k+2},\ldots,a_{k+n-1}$$

Herein, $a_{k+1}, a_{k+2}, \ldots, a_{k+n-1}$ represents latter n−1 bits of the sequence whose length is 2n and that meets the foregoing condition.

It should be noted that a value of $a_i$ (k+1≤i≤k+n−1) is a or 1.

(b) Construct the following equation based on the sequence whose length is 2n, where ⊕ represents a modulo 2 addition operation:

$$a_k = \sum_{i=1}^{n} C_i a_{k-i}, a_k = 1, a_{k-n} = 1$$

$$a_{k+1} = C_1 a_k \oplus C_2 a_{k-1} \oplus \ldots \oplus C_n a_{k-n+1}$$

$$a_{k+2} = C_1 a_{k+1} \oplus C_2 a_k \oplus \ldots \oplus C_n a_{k-n+2}$$

$$a_{k+n-1} = C_1 a_{k+n-2} \oplus C_2 a_{k+n-3} \oplus \ldots \oplus C_n a_{k-1}$$

(c) Solve the equation in (b), to obtain a coefficient:

$$C_1 = a_{k+1}$$

$$C_2 = a_{k+2} \beta C_1 a_{k+1}$$

$$C_{n-1} = a_{k+n-1} \oplus C_1 a_{k+n-2} \oplus C_2 a_{k+n-3} \oplus \ldots \oplus C_{n-2} a_{k+1}$$

(d) Substitute the coefficient obtained through solving in (c) into the primitive polynomial $f_1(x)=1+C_1x_1+C_2x_2+\ldots+C_nx_n$, to obtain the primitive polynomial of the m-sequence S obtained after sampling.

(3) Determine, based on the primitive polynomial of the sequence α', a primitive polynomial of a sequence b in a preferred pair (namely, another example of a fifth sequence) that can generate a Gold sequence, where the primitive polynomial of the selected sequence b is $f_2(x)=1+x+x^7$, and an initial state of a shift register that generates the sequence b is (0, 0, 0, 0, 0, 0, 1); and construct, based on the sequence α' and the sequence b, a sequence c (namely, another example of a fourth sequence) corresponding to the secondary SS, where the sequence c is a Gold sequence, and the sequence c constructed in the foregoing manner is the same as a sequence of an SSS in NR.

(4) Navigation sequence generation method includes: performing ($2^8$+1) cyclic sampling on the sequence α, to obtain a sequence α" (namely, an example of a third sequence).

In an implementation, a modulo 2 addition operation is performed on the sequence α, the sequence α', and the sequence α", to obtain a Kasami large set sequence (namely, an example of a first Kasami sequence), and the Kasami large set sequence or a truncated sequence of the Kasami large set sequence is used as a navigation sequence.

In another implementation, a modulo 2 addition operation is performed on the sequence α and the sequence α", to obtain a Kasami small set sequence (namely, an example of a second Kasami sequence), and the Kasami small set sequence or a truncated sequence of the Kasami small set sequence is used as a navigation sequence.

In this embodiment, when an existing NR protocol communication broadcast signal is not changed, navigation and positioning performance is improved, and an ultra dense satellite network of 10000+ satellites can be supported.

In another example, this application provides a sequence design method in which a primary SS is different from a PSS and a secondary SS is different from an SSS in ICaN. A sequence generation process is the same as the procedure in FIG. 3. There are the following specific steps.

(1) Generate a 14-stage m-sequence α (namely, another example of a first sequence, where a length is 16384-1), where a primitive polynomial of the sequence α is $f(x)=1+x+x^3+x^5+x^{14}$, and an initial state of a shift register that generates the sequence α is (1, 1, 1, 1, 1, 1, 1, 1, 1, 1, 1, 1, 1, 1).

Figure 4:
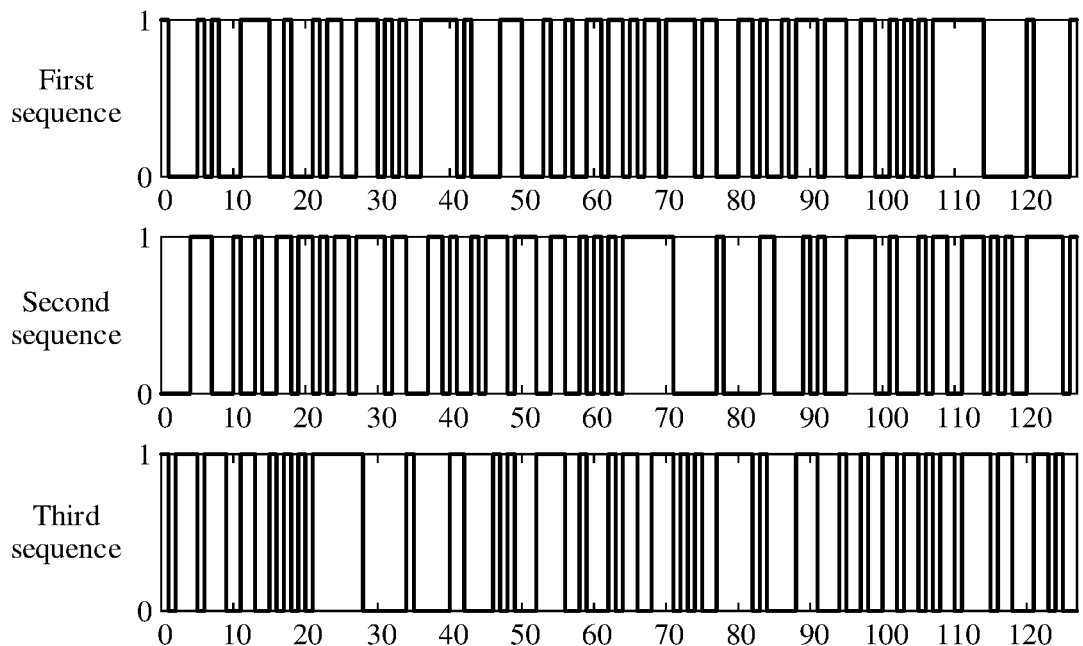
FIG. 4 is a schematic diagram of (three) generated sequences of a primary synchronization signal.

(2) Perform ($2^{7+1}$) cyclic sampling on the sequence α, to obtain a sequence α' (namely, another example of a second sequence) corresponding to the primary SS, and learn, through solving, that a primitive polynomial of the sequence α' is $f_1(x)=1+x^6+x^7$, where the primitive polynomial is different from a PSS in NR. FIG. 4 is a schematic diagram of (three) generated sequences of a primary synchronization signal.

Figure 5:
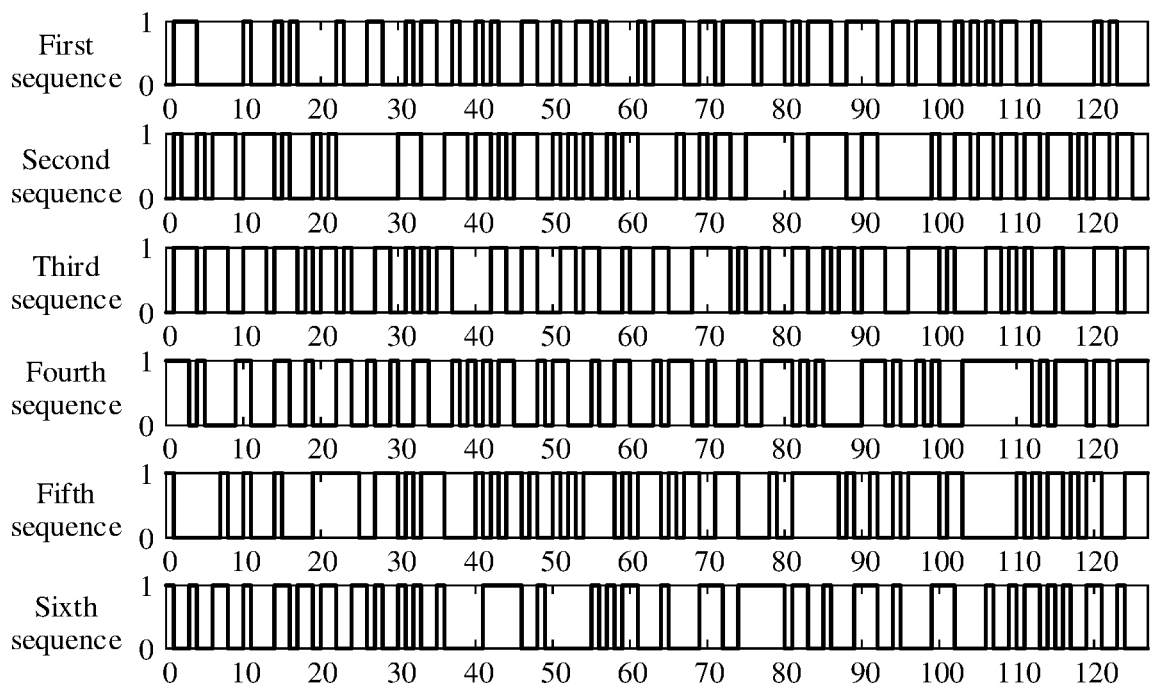
FIG. 5 is a schematic diagram of (six) generated sequences of a secondary synchronization signal.

(3) Determine, based on the primitive polynomial of the sequence α' by searching a table, a primitive polynomial of a sequence b in a preferred pair (namely, an example of a fifth sequence) that can generate a Gold sequence, where the primitive polynomial of the selected sequence b is $f_2(x)=1+x^3+x^7$, and an initial state of a shift register that generates the sequence b is (0, 0, 0, 0, 0, 0, 1); and construct, based on the sequence α' and the sequence b, a sequence c (namely, an example of a fourth sequence) corresponding to the secondary SS, where the sequence c is a Gold sequence, and the sequence c constructed in the foregoing manner is different from a sequence of an SSS in NR. FIG. 5 is a schematic diagram of (six) generated sequences of a secondary synchronization signal.

Figure 6:
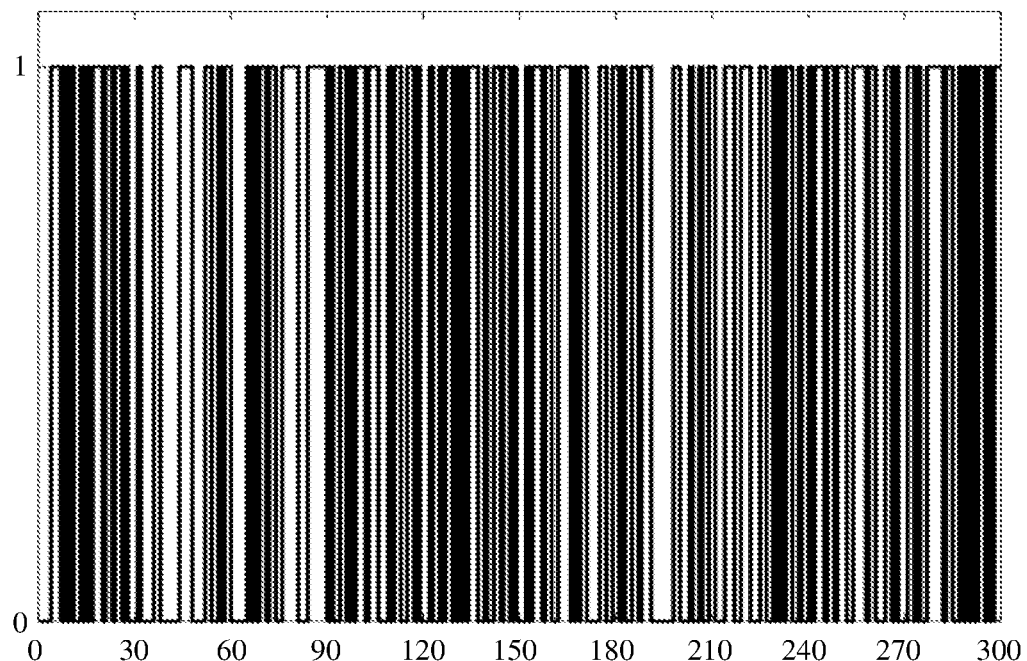
FIG. 6 is a schematic diagram of a generated navigation sequence.

(4) Navigation sequence generation method includes: performing ($2^8+1$) cyclic sampling on the sequence α, to obtain a sequence α" (namely, an example of a third sequence). For example, a modulo 2 addition operation is performed on the sequence α, the sequence α', and the sequence α", to obtain a Kasami large set sequence (namely, an example of a first Kasami sequence), and the Kasami large set sequence is used as a navigation sequence. A cyclic shift is performed on the Kasami large set sequence, and each shift corresponds to an identifier of one satellite. In other words, 16383 satellites are supported. FIG. 6 is a schematic diagram of a generated navigation sequence. Because the generated navigation sequence is long, FIG. 6 is only a schematic diagram of first 300 bits of the navigation sequence.

It should be understood that, merely an example of a sequence design method in which a primary SS is different from a PSS and a secondary SS is different from an SSS is provided in this implementation, and there are a plurality of other sequence design methods. The other sequence design methods are not listed one by one in this application.

In this embodiment, a sequence design method in which a primary SS is different from a PSS and a secondary SS is different from an SSS is provided, navigation and positioning performance is improved, and an ultra dense satellite network of 10000+ satellites can be supported.

Figure 7:
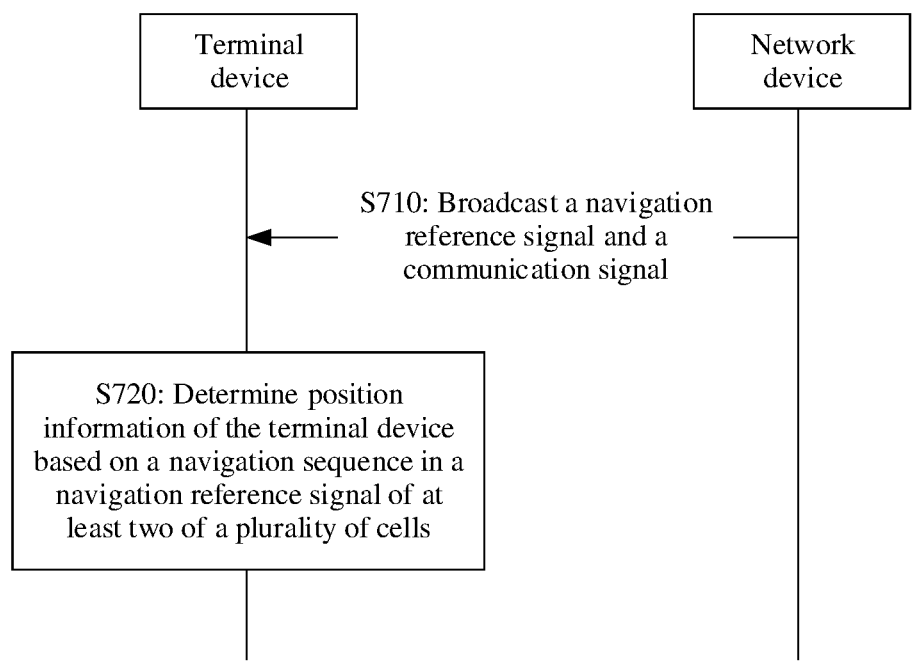
FIG. 7 is a schematic interaction diagram of a signal broadcasting method according to an embodiment of this application.

FIG. 7 is a schematic interaction diagram of a signal transmission method according to this application.

S710: A terminal device (namely, an example of a communications apparatus) receives a navigation reference signal and a communication signal that are broadcast by a plurality of network devices.

Correspondingly, the network device broadcasts the navigation reference signal and the communication signal to the terminal device. The navigation reference signal includes a navigation sequence, the communication signal includes a primary synchronization signal, and the primary synchronization signal includes a sequence of the primary synchronization signal.

Optionally, the communication signal includes a secondary synchronization signal, and the secondary synchronization signal includes a sequence of the secondary synchronization signal.

Optionally, the network device periodically broadcasts the communication signal and a system message. Correspondingly, the terminal device periodically receives the communication signal and the system message.

Figure 8:
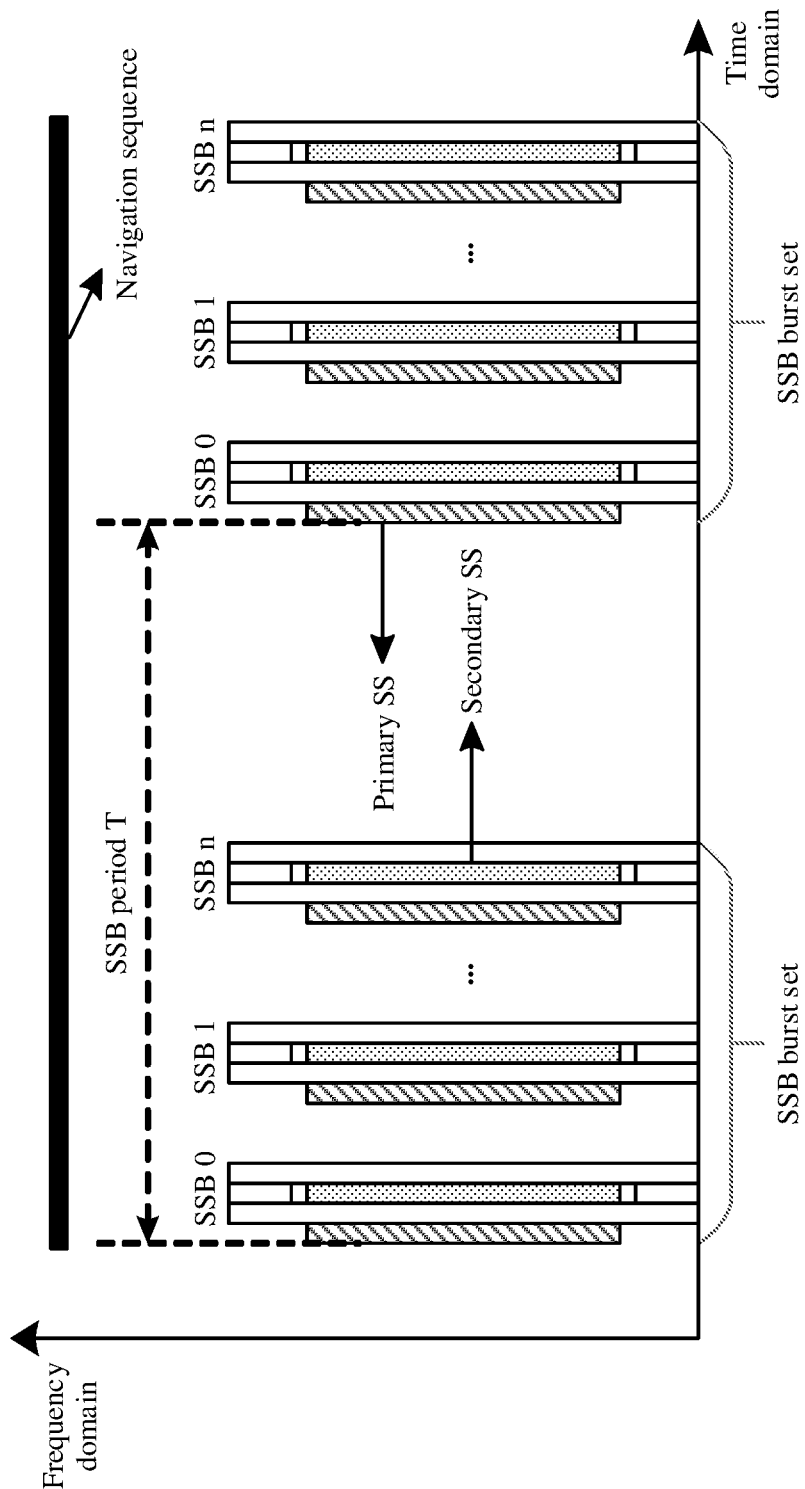
FIG. 8 is a diagram of a design framework of periodically broadcasting a navigation sequence according to an embodiment of this application.

For descriptions of a sequence design method of the navigation sequence, the sequence of the primary synchronization signal, and the sequence of the secondary synchronization signal, refer to the foregoing descriptions. Details are not described herein again. FIG. 8 is a diagram of a design framework of periodically broadcasting a navigation sequence according to this application. As shown in FIG. 8, a communication signal SSB broadcast on a network side includes a primary SS and a secondary SS, and the navigation signal is periodically broadcast on a first time-frequency resource. The first time-frequency resource is a time domain resource corresponding to the navigation sequence in FIG. 8 in time domain and a corresponding frequency domain resource in frequency domain.

In an implementation, the terminal device sends a positioning request to the plurality of network devices. Correspondingly, the network device receives the positioning request. In addition, the network device periodically broadcasts and sends a navigation reference signal of a cell on the first time-frequency resource based on the positioning request. The terminal device periodically receives, on the first time-frequency resource, a navigation reference signal that is of a plurality of cells and that is broadcast by the plurality of network devices. The first time-frequency resource is a fixed time-frequency resource.

Figure 9:
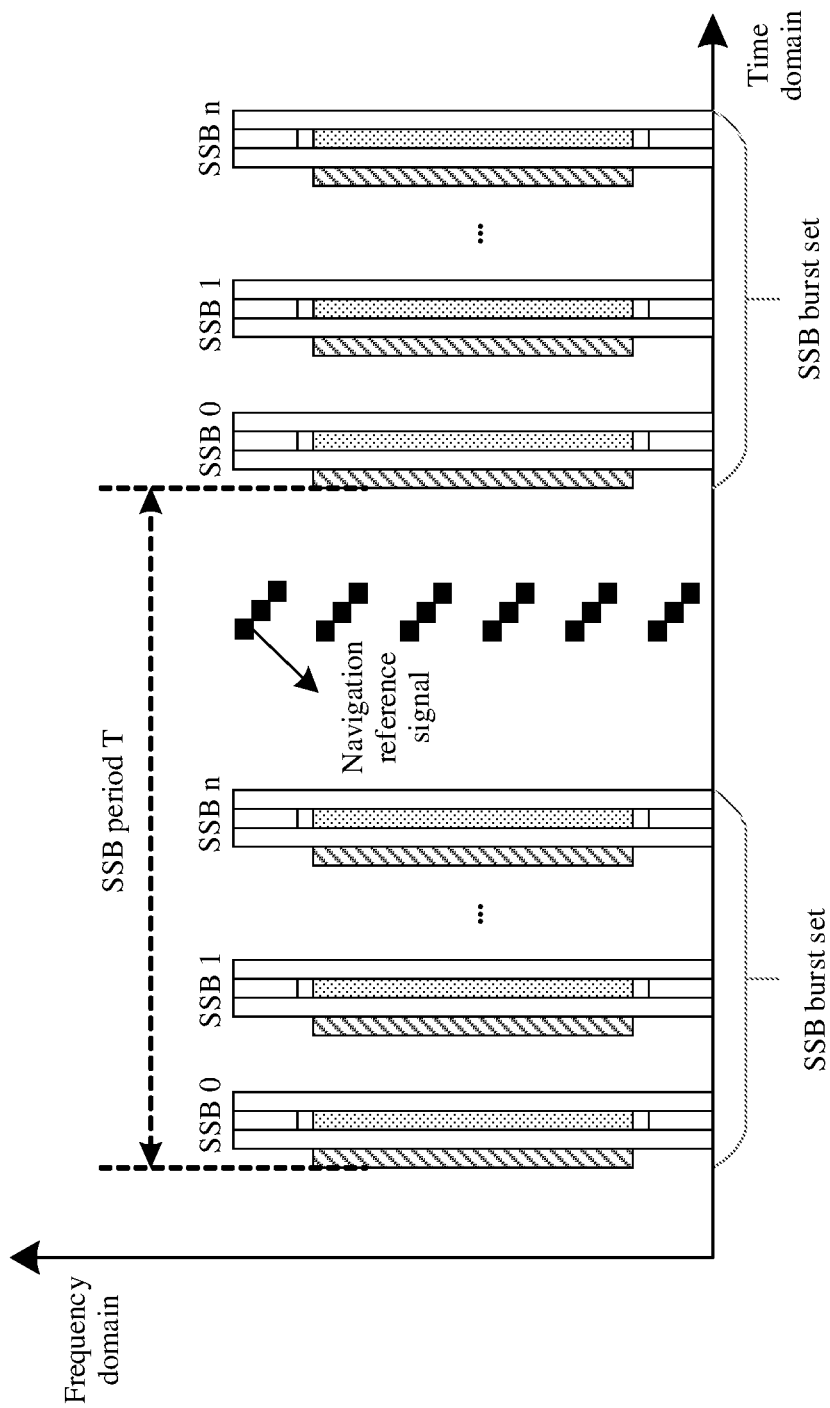
FIG. 9 is a diagram of a design framework of broadcasting a navigation sequence based on a requirement according to an embodiment of this application.

FIG. 9 is a diagram of a design framework of broadcasting a navigation sequence based on a requirement according to this application. As shown in FIG. 9, a communication signal SSB broadcast on the network side also includes the primary SS and the secondary SS shown in FIG. 8, and the navigation reference signal is broadcast on a second time-frequency resource based on the requirement. The second time-frequency resource is a time domain resource corresponding to a navigation reference signal in FIG. 9 in time domain and a corresponding frequency domain resource in frequency domain.

In another implementation, the terminal device sends a positioning request to the network device. Correspondingly, the network device receives the positioning request. In addition, the network device broadcasts, based on the requirement, a navigation reference signal of a cell on the second time-frequency resource based on the positioning request. The terminal device receives, on the second time-frequency resource, the navigation reference signal that is of the plurality of cells and that is broadcast by the plurality of network devices. A time-frequency resource (namely, the second time-frequency resource) occupied to send the navigation reference signal may be flexibly configured. Compared with a periodic broadcast manner, in this implementation, utilization of a time-frequency resource can be improved.

Optionally, different cells in the plurality of cells may perform frequency division broadcasting of the navigation reference signal in a four-color or eight-color multiplexing manner.

Optionally, for another design of the navigation reference signal, refer to a design of a PRS reference signal of an existing cellular network. Details are not described herein again.

S720: The terminal device determines position information of the terminal device based on a navigation sequence in a navigation reference signal of at least two of the plurality of cells.

It should be noted that the terminal device needs to determine the position information of the terminal device based on a navigation reference signal sent by at least two different network devices. Therefore, the at least two cells herein are cells of at least two different network devices.

Optionally, the terminal device may calculate a pseudorange or a delay difference based on the received navigation sequence of the at least two of the plurality of different cells, establish a differential positioning equation based on the pseudorange or delay difference, and parse out the position information of the terminal device based on a positioning algorithm (for example, a Gauss-Newton method).

In the foregoing technical solution, the terminal device may complete a navigation/positioning function based on an instruction broadcast signal, to complete network self-positioning without a need to be supported by a GNSS, and resolve a next-generation satellite dynamic networking problem. In addition, a cross-correlation between navigation sequences is better than that between existing gold sequences, there is a large quantity of navigation sequences, the navigation sequence is applicable to an ultra dense satellite network.

The foregoing describes in detail the method for designing a broadcast signal provided in this application, and the following describes a communications apparatus provided in this application.

Figure 10:
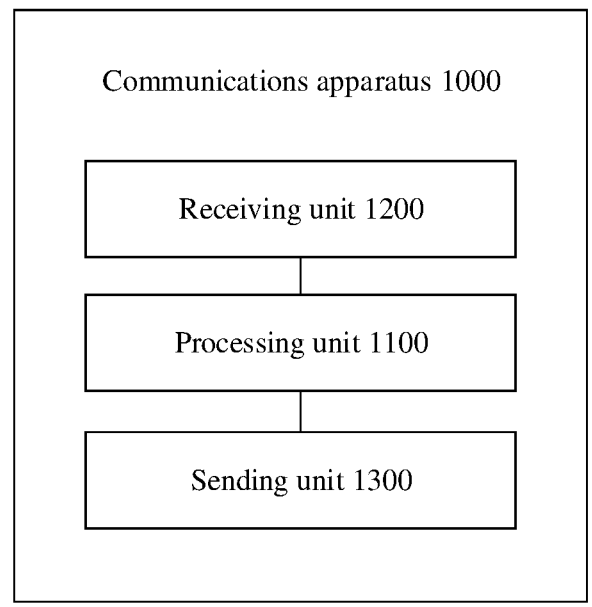
FIG. 10 is a schematic block diagram of a communications apparatus 1000 according to an embodiment of this application.

FIG. 10 is a schematic block diagram of a communications apparatus 1000 according to this application. As shown in FIG. 6, the communications apparatus 1000 includes a processing unit 1100.

The processing unit 1100 is configured to obtain a first sequence. The first sequence is an n-stage m-sequence, and n is a positive even number. The processing unit 1100 is further configured to perform cyclic sampling every first interval starting from any position in the first sequence, to obtain a second sequence. The second sequence is an n/2-stage m-sequence. The processing unit 1100 is further configured to perform a cyclic shift on the second sequence, to obtain a sequence of a primary synchronization signal. The processing unit 1100 is further configured to perform cyclic sampling every second interval starting from any position in the first sequence, to obtain a third sequence. The third sequence is an n-stage m-sequence. The processing unit 1100 is further configured to determine a Kasami sequence based on the first sequence and the third sequence. The processing unit 1100 is further configured to determine a sequence of a navigation signal based on the Kasami sequence. The processing unit 1100 is further configured to determine the broadcast signal. The broadcast signal includes the primary synchronization signal and the navigation signal.

Optionally, in an embodiment, the first interval is $2^{(n/2)}+1$, and the second interval is $2^{(n/2+1)}+1$.

Optionally, in an embodiment, the processing unit 1100 is specifically configured to: perform a modulo 2 addition operation on the first sequence, the second sequence, and the third sequence, to obtain a first Kasami sequence; and determine the sequence of the navigation signal based on the first Kasami sequence or a truncated sequence of the first Kasami sequence.

Optionally, in an embodiment, the processing unit 1100 is specifically configured to: perform a modulo 2 addition operation on the first sequence and the third sequence, to obtain a second Kasami sequence; and determine the sequence of the navigation signal based on the second Kasami sequence or a truncated sequence of the second Kasami sequence.

Optionally, in an embodiment, the processing unit 1100 is specifically configured to obtain the first sequence based on a primitive polynomial of the first sequence and an initial state of a shift register that generates the first sequence.

Optionally, in an embodiment, the processing unit 1100 is specifically configured to: determine a fourth sequence based on the second sequence. The fourth sequence is a Gold sequence; and perform a cyclic shift on the fourth sequence, to obtain a sequence of a secondary synchronization signal. The broadcast signal includes the secondary synchronization signal.

Optionally, in an embodiment, the processing unit 1100 is specifically configured to: determine a primitive polynomial of the second sequence based on the second sequence; determine a primitive polynomial of a fifth sequence based on the primitive polynomial of the second sequence, where the fifth sequence and the second sequence are a preferred pair of sequences that can form the Gold sequence; determine the fifth sequence based on the primitive polynomial of the fifth sequence and an initial state of a shift register that generates the fifth sequence; and determine the fourth sequence based on the second sequence and the fifth sequence.

Optionally, in an embodiment, when n=14, the primitive polynomial of the first sequence is $f(x)=1+x^8+x^9+x^{10}+x^{11}+x^{13}+x^{14}$, the initial state of the shift register that generates the first sequence is (1, 1, 1, 1, 1, 1, 1, 1, 1, 1, 1, 1, 1, 1), the primitive polynomial of the second sequence is $f_1(x)=1+x^4+x^7$, the primitive polynomial of the fifth sequence is $f_2(x)=1+x+x^7$, and the initial state of the shift register that generates the fifth sequence is (0, 0, 0, 0, 0, 0, 1).

Optionally, in an embodiment, when n=14, the primitive polynomial of the first sequence is $f(x)=1+x+x^3+x^5+x^{14}$, an initial state of a shift register that generates a 14-stage m-sequence is (1, 1, 1, 1, 1, 1, 1, 1, 1, 1, 1, 1, 1, 1), the primitive polynomial of the second sequence is $f_1(x)=1+x^6+x^7$, a primitive polynomial of the third sequence is $f_2(x)=1+x^3+x^7$, and an initial state of a shift register that generates the third sequence is (0, 0, 0, 0, 0, 0, 1).

Optionally, the communications apparatus may further include a receiving unit 1200 and a sending unit 1300. In the foregoing implementations, the receiving unit 1200 and the sending unit 1300 may also be integrated into one transceiver unit, and have both a receiving function and a sending function. This is not limited herein.

Optionally, in an example, the receiving unit 1200 in the communications apparatus 1000 may be a receiver, and the sending unit 1300 may be a transmitter. The receiver and the transmitter may also be integrated into a transceiver.

Optionally, in another example, the communications apparatus 1000 may be a chip or an integrated circuit. In this case, the receiving unit 1200 and the sending unit 1300 may be a communications interface or an interface circuit. For example, the receiving unit 1200 is an input interface or an input circuit, and the sending unit 1300 is an output interface or an output circuit.

In various examples, the processing unit 1100 is configured to perform processing and/or an operation that need/needs to be implemented in FIG. 2 and FIG. 3 in addition to a sending action and a receiving action.

The processing unit 1100 may be a processing apparatus. A function of the processing apparatus may be implemented by using hardware, or may be implemented by hardware executing corresponding software. For example, the processing apparatus may include at least one processor and at least one memory, the at least one memory is configured to store a computer program, and the at least one processor reads and executes the computer program stored in the at least one memory, so that the communications apparatus 1000 performs the operation and/or processing that need/needs to be performed in FIG. 2 and FIG. 3.

Optionally, the processing apparatus may include only the processor, and the memory configured to store a computer program is located outside the processing apparatus. The processor is connected to the memory through a circuit/wire, to read and execute the computer program stored in the memory.

Optionally, in some examples, the processing apparatus may alternatively be a chip or an integrated circuit. For example, the processing apparatus includes a processing circuit/logic circuit and an interface circuit, the interface circuit is configured to: receive a signal and/or data, and transmit the signal and/or data to the processing circuit, and the processing circuit processes the signal and/or data, so that the operation and/or processing performed in FIG. 2 and FIG. 3 are/is performed.

Figure 11:
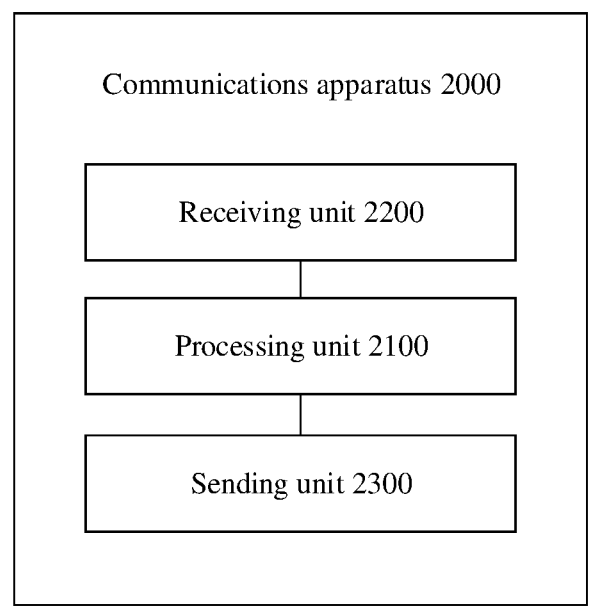
FIG. 11 is a schematic block diagram of a communications apparatus 2000 according to an embodiment of this application.

FIG. 11 is a schematic block diagram of a communications apparatus 2000 according to this application. As shown in FIG. 11, the communications apparatus 2000 includes a receiving unit 2200 and a sending unit 2300.

The sending unit 2300 is configured to broadcast a navigation reference signal and a communication signal. The navigation reference signal includes a navigation sequence, the navigation sequence is a Kasami sequence determined based on a first sequence and a third sequence, the communication signal includes a primary synchronization signal, and the primary synchronization signal is a sequence determined after a cyclic shift is performed on a second sequence. The first sequence is an n-stage m-sequence, n is a positive even number, the second sequence is an n/2-stage m-sequence obtained by performing cyclic sampling every first interval starting from any position in the first sequence, the third sequence is an n-stage m-sequence obtained by performing cyclic sampling every second interval starting from any position in the first sequence, and the navigation reference signal is used by the communications apparatus to determine position information.

Optionally, in an embodiment, the first interval is $2^{(n/2)}+1$, and the second interval is $2^{(n/2+1)}+1$.

Optionally, in an embodiment, that the navigation sequence is a Kasami sequence determined based on the first sequence and the third sequence includes: the navigation sequence is a first Kasami sequence obtained by performing a modulo 2 addition operation on the first sequence, the second sequence, and the third sequence or a truncated sequence of the first Kasami sequence.

Optionally, in an embodiment, that the navigation sequence is a Kasami sequence determined based on the first sequence and the third sequence includes: the navigation sequence is a second Kasami sequence obtained by performing a modulo 2 addition operation on the first sequence and the third sequence or a truncated sequence of the second Kasami sequence.

Optionally, in an embodiment, the first sequence is a sequence determined based on a primitive polynomial of the first sequence and an initial state of a shift register that generates the first sequence.

Optionally, in an embodiment, the communication signal includes a secondary synchronization signal, the secondary synchronization signal is a sequence determined after a cyclic shift is performed on a fourth sequence, and the fourth sequence is a Gold sequence determined based on the second sequence.

Optionally, in an embodiment, that the fourth sequence is a Gold sequence determined based on the second sequence includes: the fourth sequence is a Gold sequence determined based on the second sequence and a fifth sequence. The fifth sequence and the second sequence are a preferred pair of sequences that can form a Gold sequence, the fifth sequence is determined based on a primitive polynomial of the fifth sequence and an initial state of a shift register that generates the fifth sequence, and the primitive polynomial of the fifth sequence is determined based on a primitive polynomial of the second sequence.

Optionally, in an embodiment, when n=14, the primitive polynomial of the first sequence is $f(x)=1+x^8+x^9+x^{10}+x^{11}+x^{13}+x^{14}$, the initial state of the shift register that generates the first sequence is (1, 1, 1, 1, 1, 1, 1, 1, 1, 1, 1, 1, 1, 1), the primitive polynomial of the second sequence is $f_1(x)=1+x^4+x^7$, the primitive polynomial of the fifth sequence is $f_2(x)=1+x+x^7$, and the initial state of the shift register that generates the fifth sequence is (0, 0, 0, 0, 0, 0, 1).

Optionally, in an embodiment, when n=14, the primitive polynomial of the first sequence is $f(x)=1+x+x^3+x^5+x^{14}$, an initial state of a shift register that generates a 14-stage m-sequence is (1, 1, 1, 1, 1, 1, 1, 1, 1, 1, 1, 1, 1, 1), the primitive polynomial of the second sequence is $f_1(x)=1+x^6+x^7$, a primitive polynomial of the third sequence is $f_2(x)=1+x^3+x^7$, and an initial state of a shift register that generates the third sequence is (0, 0, 0, 0, 0, 0, 1).

Optionally, in an embodiment, the receiving unit 2200 is configured to receive a positioning request sent by a terminal device. The sending unit 2300 is specifically configured to: periodically broadcast the navigation reference signal on a first time-frequency resource based on the positioning request, where the first time-frequency resource is a fixed time-frequency resource; or broadcast the navigation reference signal on a second time-frequency resource based on the positioning request, where the second time-frequency resource is a configurable time-frequency resource.

In the foregoing implementations, the receiving unit 2200 and the sending unit 2300 may also be integrated into one transceiver unit, and have both a receiving function and a sending function. This is not limited herein.

Optionally, in an example, the communications apparatus 2000 may be a satellite or a network device in the method embodiments. In this case, the receiving unit 2200 may be a receiver, and the sending unit 2300 may be a transmitter. The receiver and the transmitter may also be integrated into a transceiver.

Optionally, in another example, the communications apparatus 2000 may be a chip or an integrated circuit in a satellite or a network device. In this case, the receiving unit 2200 and the sending unit 2300 may be a communications interface or an interface circuit. For example, the receiving unit 2200 is an input interface or an input circuit, and the sending unit 2300 is an output interface or an output circuit.

Optionally, the communications apparatus 2000 may further include a processing unit 2100. In various examples, the processing unit 2100 is configured to perform processing and/or an operation implemented inside the network device in addition to a sending action and/or a receiving action.

The processing unit 2100 may be a processing apparatus. A function of the processing apparatus may be implemented by using hardware, or may be implemented by hardware executing corresponding software. For example, the processing apparatus may include at least one processor and at least one memory, the at least one memory is configured to store a computer program, and the at least one processor reads and executes the computer program stored in the at least one memory, so that the communications apparatus 2000 performs the operation and/or processing performed by the network device in the various method embodiments.

Optionally, the processing apparatus may include only the processor, and the memory configured to store a computer program is located outside the processing apparatus. The processor is connected to the memory through a circuit/wire, to read and execute the computer program stored in the memory.

Optionally, in some examples, the processing apparatus may alternatively be a chip or an integrated circuit. For example, the processing apparatus includes a processing circuit/logic circuit and an interface circuit, the interface circuit is configured to: receive a signal and/or data, and transmit the signal and/or data to the processing circuit, and the processing circuit processes the signal and/or data, so that the operation and/or processing performed by the network device in the various method embodiments are/is performed.

Figure 12:
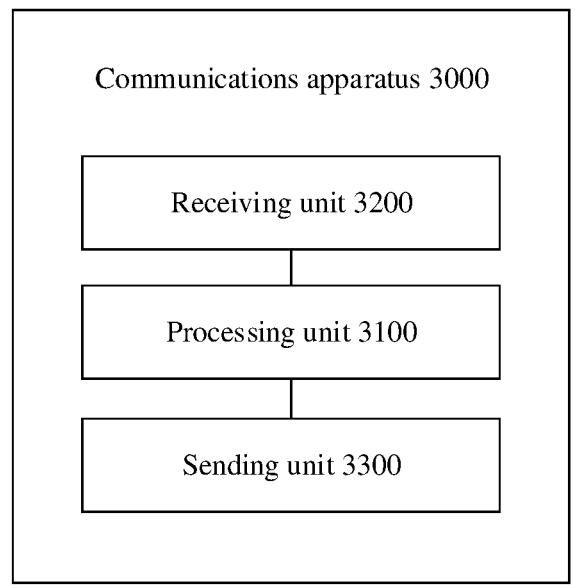
FIG. 12 is a schematic block diagram of a communications apparatus 3000 according to an embodiment of this application.

FIG. 12 is a schematic block diagram of a communications apparatus 3000 according to this application. As shown in FIG. 12, the communications apparatus 3000 includes a processing unit 3100, a receiving unit 3200, and a sending unit 3300.

The receiving unit 3200 is configured to receive a navigation reference signal and a communication signal that are of a plurality of cells and that are broadcast by a plurality of network devices. The navigation reference signal includes a navigation sequence, the navigation sequence is a Kasami sequence determined based on a first sequence and a third sequence, the communication signal includes a primary synchronization signal, and the primary synchronization signal is a sequence determined after a cyclic shift is performed on a second sequence. The first sequence is an n-stage m-sequence, n is a positive even number, the second sequence is an n/2-stage m-sequence obtained by performing cyclic sampling every first interval starting from any position in the first sequence, and the third sequence is an n-stage m-sequence obtained by performing cyclic sampling every second interval starting from any position in the first sequence. The processing unit 3100 is configured to determine, based on a navigation sequence in a navigation reference signal of at least two of the plurality of cells, position information of a terminal device configured with the apparatus.

Optionally, in an embodiment, the first interval is $2^{(n/2)}+1$, and the second interval is $2^{(n/2+1)}+1$.

Optionally, in an embodiment, that the navigation sequence is a Kasami sequence determined based on the first sequence and the third sequence includes: the navigation sequence is a first Kasami sequence obtained by performing a modulo 2 addition operation on the first sequence, the second sequence, and the third sequence or a truncated sequence of the first Kasami sequence.

Optionally, in an embodiment, that the navigation sequence is a Kasami sequence determined based on the first sequence and the third sequence includes: the navigation sequence is a second Kasami sequence obtained by performing a modulo 2 addition operation on the first sequence and the third sequence or a truncated sequence of the second Kasami sequence.

Optionally, in an embodiment, the first sequence is a sequence determined based on a primitive polynomial of the first sequence and an initial state of a shift register that generates the first sequence.

Optionally, in an embodiment, the communication signal includes a secondary synchronization signal, the secondary synchronization signal is a sequence determined after a cyclic shift is performed on a fourth sequence, and the fourth sequence is a Gold sequence determined based on the second sequence.

Optionally, in an embodiment, that the fourth sequence is a Gold sequence determined based on the second sequence includes: the fourth sequence is a Gold sequence determined based on the second sequence and a fifth sequence. The fifth sequence and the second sequence are a preferred pair of sequences that can form a Gold sequence, the fifth sequence is determined based on a primitive polynomial of the fifth sequence and an initial state of a shift register that generates the fifth sequence, and the primitive polynomial of the fifth sequence is determined based on a primitive polynomial of the second sequence.

Optionally, in an embodiment, when n=14, the primitive polynomial of the first sequence is $f(x)=1+x^8+x^9+x^{10}+x^{11}+x^{13}+x^{14}$, the initial state of the shift register that generates the first sequence is (1, 1, 1, 1, 1, 1, 1, 1, 1, 1, 1, 1, 1, 1), the primitive polynomial of the second sequence is $f_1(x)=1+x^4+x^7$, the primitive polynomial of the fifth sequence is $f_2(x)=1+x+x^7$, and the initial state of the shift register that generates the fifth sequence is (0, 0, 0, 0, 0, 0, 1).

Optionally, in an embodiment, when n=14, the primitive polynomial of the first sequence is $f(x)=1+x+x^3+x^5+x^{14}$, an initial state of a shift register that generates a 14-stage m-sequence is (1, 1, 1, 1, 1, 1, 1, 1, 1, 1, 1, 1, 1, 1), the primitive polynomial of the second sequence is $f_1(x)=1+x^6+x^7$, a primitive polynomial of the third sequence is $f_2(x)=1+x^3+x^7$, and an initial state of a shift register that generates the third sequence is (0, 0, 0, 0, 0, 0, 1).

Optionally, in an embodiment, the sending unit 3300 is configured to send a positioning request to the plurality of network devices. The receiving unit 3200 is specifically configured to: periodically receive, on a first time-frequency resource, the navigation reference signal that is of the plurality of cells and that is sent by the plurality of network devices based on the positioning request, where the first time-frequency resource is a fixed time-frequency resource; or receive, on a second time-frequency resource, the navigation reference signal that is of the plurality of cells and that is sent by the plurality of network devices based on the positioning request, where the second time-frequency resource is a configurable time-frequency resource.

In the foregoing implementations, the receiving unit 3200 and the sending unit 3300 may also be integrated into one transceiver unit, and have both a receiving function and a sending function. This is not limited herein.

Optionally, in an example, the communications apparatus 3000 may be a terminal device in the method embodiments. In this case, the receiving unit 3200 may be a receiver, and the sending unit 3300 may be a transmitter. The receiver and the transmitter may also be integrated into a transceiver.

Optionally, in another example, the communications apparatus 3000 may be a chip or an integrated circuit in the terminal device. In this case, the receiving unit 3200 and the sending unit 3300 may be a communications interface or an interface circuit. For example, the receiving unit 3200 is an input interface or an input circuit, and the sending unit 3300 is an output interface or an output circuit.

Optionally, the communications apparatus 3000 may further include a processing unit 3100. In various examples, the processing unit 3100 is configured to perform processing and/or an operation implemented inside the terminal device in addition to a sending action and/or a receiving action.

The processing unit 3100 may be a processing apparatus. A function of the processing apparatus may be implemented by using hardware, or may be implemented by hardware executing corresponding software. For example, the processing apparatus may include at least one processor and at least one memory, the at least one memory is configured to store a computer program, and the at least one processor reads and executes the computer program stored in the at least one memory, so that the communications apparatus 3000 performs the operation and/or processing performed by the terminal device in the various method embodiments.

Optionally, the processing apparatus may include only the processor, and the memory configured to store a computer program is located outside the processing apparatus. The processor is connected to the memory through a circuit/wire, to read and execute the computer program stored in the memory.

Optionally, in some examples, the processing apparatus may alternatively be a chip or an integrated circuit. For example, the processing apparatus includes a processing circuit/logic circuit and an interface circuit, the interface circuit is configured to: receive a signal and/or data, and transmit the signal and/or data to the processing circuit, and the processing circuit processes the signal and/or data, so that the operation and/or processing performed by the terminal device in the various method embodiments are/is performed.

Figure 13:
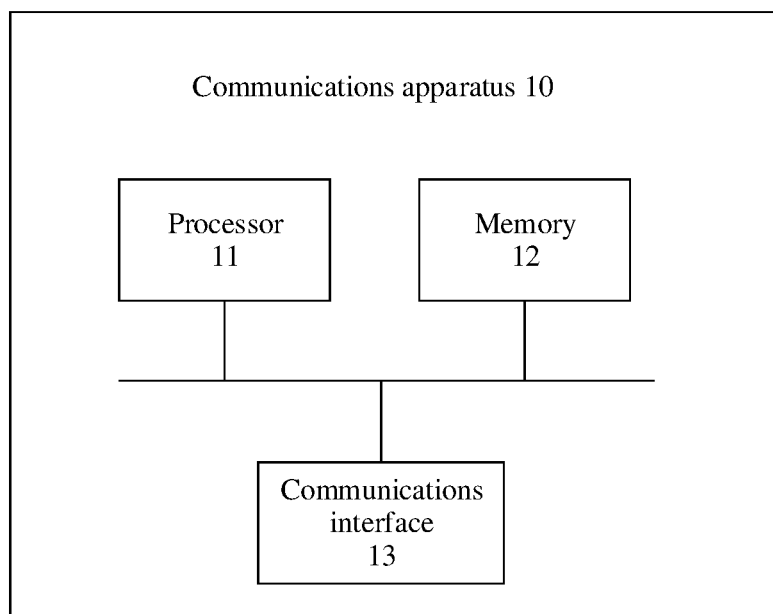
FIG. 13 is a schematic diagram of a structure of a communications apparatus 10 according to an embodiment of this application.

FIG. 13 is a schematic diagram of a structure of a communications apparatus 10 according to this application. As shown in FIG. 13, the communications apparatus 10 includes one or more processors 11, one or more memories 12, and one or more communications interfaces 13. The processor 11 is configured to control the communications interface 13 to send or receive a signal, the memory 12 is configured to store a computer program, and the processor 11 is configured to invoke and run the computer program from the memory 12, so that a procedure and/or an operation performed by the terminal device in the method embodiments of this application are/is performed.

For example, the processor 11 may have a function of the processing unit 1100 shown in FIG. 10, and the communications interface 13 may have a function of the receiving unit 1200 and/or the sending unit 1300 shown in FIG. 10. Specifically, the processor 11 may be configured to perform processing or an operation that needs to be performed internally in FIG. 2 and FIG. 3, and the communications interface 13 is configured to perform a sending action and/or a receiving action that need/needs to be performed in FIG. 2 and FIG. 3.

In an implementation, the communications interface 13 in the communications apparatus 10 may be a transceiver. The transceiver may include a receiver and a transmitter. Optionally, the processor 11 may be a baseband apparatus, and the communications interface 13 may be a radio frequency apparatus. In another implementation, the communications apparatus 10 may be a chip or an integrated circuit. In this implementation, the communications interface 13 may be an interface circuit or an input/output interface.

Figure 14:
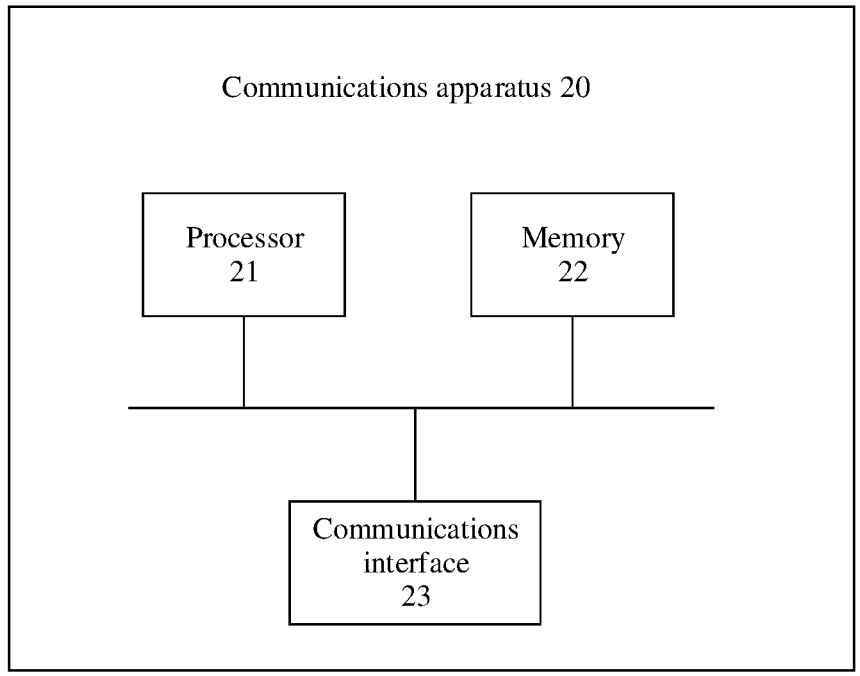
FIG. 14 is a schematic diagram of a structure of a communications apparatus 20 according to an embodiment of this application.

FIG. 14 is a schematic diagram of a structure of a communications apparatus 20 according to this application. As shown in FIG. 14, the communications apparatus 20 includes one or more processors 21, one or more memories 22, and one or more communications interfaces 23. The processor 21 is configured to control the communications interface 23 to send or receive a signal, the memory 22 is configured to store a computer program, and the processor 21 is configured to invoke and run the computer program from the memory 22, so that a procedure and/or an operation performed by a network device in the method embodiments of this application are/is performed.

For example, the processor 21 may have a function of the processing unit 2100 shown in FIG. 11, and the communications interface 23 may have a function of the receiving unit 2200 and/or the sending unit 2300 shown in FIG. 11. Specifically, the processor 21 may be configured to perform processing or an operation that needs to be performed inside the network device in FIG. 4, and the communications interface 23 is configured to perform a sending action and/or a receiving action that need/needs to be performed by the network device in FIG. 7.

In an implementation, the communications apparatus 20 may be the network device in the method embodiments. In this implementation, the communications interface 23 may be a transceiver. The transceiver may include a receiver and a transmitter. Optionally, the processor 21 may be a baseband apparatus, and the communications interface 23 may be a radio frequency apparatus. In another implementation, the communications apparatus 20 may be a chip or an integrated circuit installed in the network device. In this implementation, the communications interface 23 may be an interface circuit or an input/output interface.

Optionally, the memory and the processor in the apparatus embodiments may be physically independent units, or the memory and the processor may be integrated together. This is not limited herein.

Figure 15:
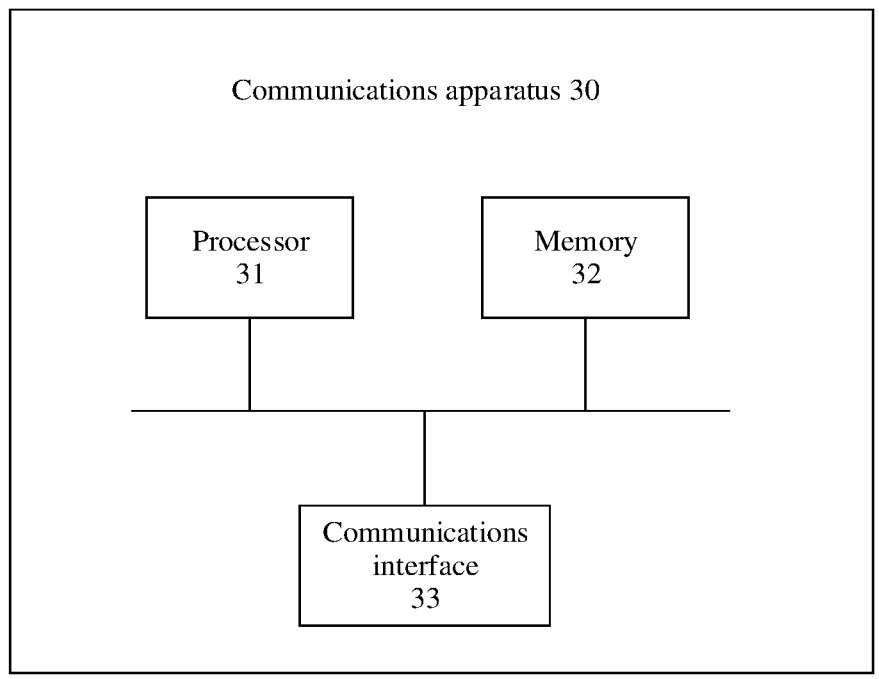
FIG. 15 is a schematic diagram of a structure of a communications apparatus 30 according to an embodiment of this application.

FIG. 15 is a schematic diagram of a structure of a communications apparatus 30 according to this application. As shown in FIG. 15, the communications apparatus 30 includes one or more processors 31, one or more memories 32, and one or more communications interfaces 33. The processor 31 is configured to control the communications interface 33 to send or receive a signal, the memory 32 is configured to store a computer program, and the processor 31 is configured to invoke and run the computer program from the memory 32, so that a procedure and/or an operation performed by the terminal device in the method embodiments of this application are/is performed.

For example, the processor 31 may have a function of the processing unit 3100 shown in FIG. 12, and the communications interface 33 may have a function of the receiving unit 3200 and/or the sending unit 3300 shown in FIG. 12. Specifically, the processor 31 may be configured to perform processing or an operation that needs to be performed inside the terminal device in FIG. 4, and the communications interface 33 is configured to perform a sending action and/or a receiving action that need/needs to be performed by the terminal device in FIG. 7.

In an implementation, the communications apparatus 30 may be the terminal device in the method embodiments. In this implementation, the communications interface 33 may be a transceiver. The transceiver may include a receiver and a transmitter. Optionally, the processor 31 may be a baseband apparatus, and the communications interface 33 may be a radio frequency apparatus. In another implementation, the communications apparatus 30 may be a chip or an integrated circuit installed in the terminal device. In this implementation, the communications interface 33 may be an interface circuit or an input/output interface.

Optionally, the memory and the processor in the apparatus embodiments may be physically independent units, or the memory and the processor may be integrated together. This is not limited herein.

In addition, this application further provides a computer-readable storage medium. The computer-readable storage medium stores computer instructions. When the computer instructions run on a computer, an operation and/or a procedure performed by a terminal device in the method embodiments of this application are/is performed.

This application further provides a computer-readable storage medium. The computer-readable storage medium stores computer instructions. When the computer instructions run on a computer, an operation and/or a procedure performed by a network device in the method embodiments of this application are/is performed.

In addition, this application further provides a computer program product. The computer program product includes computer program code or instructions. When the computer program code or the instructions run on a computer, an operation and/or a procedure performed by a terminal device in the method embodiments of this application are/is performed.

This application further provides a computer program product. The computer program product includes computer program code or instructions. When the computer program code or the instructions run on a computer, an operation and/or a procedure performed by a network device in the method embodiments of this application are/is performed.

In addition, this application further provides a chip. The chip includes a processor. A memory configured to store a computer program is disposed independently of the chip, and a processor is configured to execute the computer program stored in the memory, so that an operation and/or processing performed by a terminal device in any method embodiment are/is performed.

Further, the chip may further include a communications interface. The communications interface may be an input/output interface, or may be an interface circuit, or the like. Further, the chip may further include the memory.

This application further provides a chip. The chip includes a processor. A memory configured to store a computer program is disposed independently of the chip, and a processor is configured to execute the computer program stored in the memory, so that an operation and/or processing performed by a network device in any method embodiment are/is performed.

Further, the chip may further include a communications interface. The communications interface may be an input/output interface, or may be an interface circuit, or the like. Further, the chip may further include the memory.

In addition, this application further provides a communications apparatus (for example, may be a chip), including a processor and a communications interface. The communications interface is configured to: receive a signal, and transmit the signal to the processor, and the processor processes the signal, so that an operation and/or processing performed by a terminal device in any method embodiment are/is performed.

This application further provides a communications apparatus (for example, may be a chip), including a processor and a communications interface. The communications interface is configured to: receive a signal, and transmit the signal to the processor, and the processor processes the signal, so that an operation and/or processing performed by a network device in any method embodiment are/is performed.

In addition, this application further provides a communications apparatus, including at least one processor. The at least one processor is coupled to at least one memory, and the at least one processor is configured to execute a computer program or instructions stored in the at least one memory, so that an operation and/or processing performed by a terminal device in any method embodiment are/is performed.

This application further provides a communications apparatus, including at least one processor. The at least one processor is coupled to at least one memory, and the at least one processor is configured to execute a computer program or instructions stored in the at least one memory, so that an operation and/or processing performed by a network device in any method embodiment are/is performed.

In addition, this application further provides a communications device, including a processor, a memory, and a transceiver. The memory is configured to store a computer program, and the processor is configured to: invoke and run the computer program stored in the memory, and control the transceiver to send and receive a signal, so that the terminal device performs an operation and/or processing performed by a terminal device in any method embodiment.

This application further provides a communications device, including a processor, a memory, and a transceiver. The memory is configured to store a computer program, and the processor is configured to: invoke and run the computer program stored in the memory, and control the transceiver to send and receive a signal, so that the terminal device performs an operation and/or processing performed by a network device in any method embodiment.

In addition, this application further provides a wireless communications system, including a terminal device and a network device in embodiments of this application.

A processor in embodiments of this application may be an integrated circuit chip, and has a signal processing capability. In an implementation process, steps in the foregoing method embodiments are implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like. The steps of the methods disclosed in embodiments of this application may be directly presented as being performed and completed by a hardware encoding processor, or performed and completed by a combination of hardware and a software module in an encoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The memory in embodiments of this application may be a volatile memory or a non-volatile memory, or may include a volatile memory and a non-volatile memory. The nonvolatile memory may be a read-only memory (ROM), a programmable read-only memory (programmable ROM, PROM), an erasable programmable read only memory (erasable PROM, EPROM), an electrically erasable programmable read-only memory (electrically EPROM, EEPROM), or a flash. The volatile memory may be a random access memory (RAM), used as an external cache. Based on description used as an example instead of a limitation, RAMs in a plurality of forms are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DRRAM). It should be noted that the memory in the systems and methods described in this specification includes but is not limited to these and any memory of another appropriate type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

The term "and/or" in this specification describes only an association relationship for describing associated objects and represents that three relationships may exist. For example, A and/or B may represent the following three cases: Only A exists, both A and B exist, and only B exists. A, B, and C may be singular or plural. This is not limited.

In embodiments of this application, words such as "first" and "second" are used to distinguish between same items or similar items having basically same functions and roles. A person skilled in the art may understand that the terms such as "first" and "second" do not limit a quantity or an execution sequence, and the terms such as "first" and "second" do not indicate a definite difference.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
    receiving, by a communications apparatus, a navigation reference signal and a communication signal that are of a plurality of cells and that are broadcast by a plurality of network devices, wherein the navigation reference signal comprises a navigation sequence, the navigation sequence is a Kasami sequence determined based on a first sequence and a third sequence, the communication signal comprises a primary synchronization signal and a secondary synchronization signal, and the primary synchronization signal is a sequence determined by performing cyclic shift on a second sequence, wherein the secondary synchronization signal is determined based on a fourth sequence, the fourth sequence is determined based on the second sequence and a fifth sequence, and the fifth sequence and the second sequence are a pair of sequences for forming a Gold sequence, and wherein
    the first sequence is an n-stage m-sequence, n is a positive even number, the second sequence is an n/2-stage m-sequence obtained by performing cyclic sampling on the first sequence every first interval starting from a position in the first sequence, and the third sequence is an n-stage m-sequence obtained by performing cyclic sampling on the first sequence every second interval starting from a position in the first sequence; and determining, by the communications apparatus, position information of the communications apparatus based on the navigation sequence in the navigation reference signal of at least two cells of the plurality of cells.

2. The method according to claim 1, wherein the first interval is $2^{(n/2)}+1$ and the second interval is $2^{(n/2+1)}+1$.

3. The method according to claim 1, wherein the navigation sequence is the Kasami sequence and is obtained by performing a modulo 2 addition operation on the first sequence, the second sequence, and the third sequence, or wherein the navigation sequence is a truncated sequence of the Kasami sequence.

4. The method according to claim 1, wherein the navigation sequence is the Kasami sequence and is obtained by performing a modulo 2 addition operation on the first sequence and the third sequence, or the navigation sequence is a truncated sequence of the Kasami sequence.

5. The method according to claim 1, wherein the first sequence is a sequence determined based on a primitive polynomial of the first sequence and an initial state of a shift register that generates the first sequence.

6. The method according to claim 5, wherein the secondary synchronization signal is a determined by performing cyclic shift on the fourth sequence, and wherein
the fourth sequence is the Gold sequence and is determined based on the second sequence.

7. The method according to claim 6, wherein the fourth sequence is the Gold sequence, wherein the fifth sequence is determined based on a primitive polynomial of the fifth sequence and an initial state of a shift register that generates the fifth sequence, and the primitive polynomial of the fifth sequence is determined based on a primitive polynomial of the second sequence.

8. The method according to claim 7, wherein n=14,
the primitive polynomial of the first sequence is $f(x)=1+x^8+x^9+x^{10}+x^{11}+x^{13}+x^{14}$,
the initial state of the shift register that generates the first sequence is (1, 1, 1, 1, 1, 1, 1, 1, 1, 1, 1, 1, 1, 1),
the primitive polynomial of the second sequence is $f_1(x)=1+x^4+x^7$,
the primitive polynomial of the fifth sequence is $f_2(x)=1+x+x^7$, and the initial state of the shift register that generates the fifth sequence is (0, 0, 0, 0, 0, 0, 1).

9. The method according to claim 7, wherein n=14,
the primitive polynomial of the first sequence is $f(x)=1+x+x^3+x^5+x^{14}+$, an initial state of a shift register that generates the first sequence is (1, 1, 1, 1, 1, 1, 1, 1, 1, 1, 1, 1, 1, 1),
the primitive polynomial of the second sequence is $f_1(x)=1+x^6+x^7$,
the primitive polynomial of the third sequence is $f_2(x)=1+x^3+x^7$, and the initial state of the shift register that generates the third sequence is (0, 0, 0, 0, 0, 0, 1).

10. The method according to claim 1, further comprising:
sending, by the communications apparatus, a positioning request to the plurality of network devices; and
wherein receiving the navigation reference signal that is of the plurality of cells and that is broadcast by the plurality of network devices comprises:
periodically receiving, by the communications apparatus on a first time-frequency resource, the navigation reference signal that is of the plurality of cells and that is sent by the plurality of network devices based on the positioning request, wherein the first time-frequency resource is a fixed time-frequency resource; or receiving, by the communications apparatus on a second time-frequency resource based on a requirement, the navigation reference signal that is of the plurality of cells and that is sent by the plurality of network devices based on the positioning request, wherein the second time-frequency resource is a configurable time-frequency resource.

11. A communications apparatus comprising:
a receiver, configured to receive a navigation reference signal and a communication signal that are of a plurality of cells and that are broadcast by a plurality of network devices, wherein the navigation reference signal comprises a navigation sequence, the navigation sequence is a Kasami sequence determined based on a first sequence and a third sequence, the communication signal comprises a primary synchronization signal and a secondary synchronization signal, and the primary synchronization signal is a sequence determined by performing cyclic shift on a second sequence, wherein the secondary synchronization signal is determined based on a fourth sequence, the fourth sequence is determined based on the second sequence and a fifth sequence, and the fifth sequence and the second sequence are a pair of sequences for forming a Gold sequence, and wherein
the first sequence is an n-stage m-sequence, n is a positive even number, the second sequence is an n/2-stage m-sequence obtained by performing cyclic sampling on the first sequence every first interval starting from a position in the first sequence, and the third sequence is an n-stage m-sequence obtained by performing cyclic sampling on the first sequence every second interval starting from a position in the first sequence; and
a processor, configured to determine, based on the navigation sequence in the navigation reference signal of at least two cells of the plurality of cells, position information of a terminal device configured with the communications apparatus.

12. The apparatus according to claim 11, wherein the first interval is $2^{(n/2)}+1$ and the second interval is $2^{(n/2+1)}+1$.

13. The apparatus according to claim 11, wherein the navigation sequence is the Kasami sequence and is obtained by performing a modulo 2 addition operation on the first sequence, the second sequence, and the third sequence or the navigation sequence is a truncated sequence of the first Kasami sequence.

14. The apparatus according to claim 11, wherein the navigation sequence is the Kasami sequence and is obtained by performing a modulo 2 addition operation on the first sequence and the third sequence, or the navigation sequence is a truncated sequence of the Kasami sequence.

15. The apparatus according to claim 11, wherein the first sequence is a sequence determined based on a primitive polynomial of the first sequence and an initial state of a shift register that generates the first sequence.

16. The apparatus according to claim 11, wherein the secondary synchronization signal is determined by performing cyclic shift on the fourth sequence, and wherein
the fourth sequence is the Gold sequence and is determined based on the second sequence.

17. The apparatus according to claim 16, wherein the fourth sequence is the Gold sequence, and the fifth sequence is determined based on a primitive polynomial of the fifth sequence and an initial state of a shift register that generates the fifth sequence, and the primitive polynomial of the fifth sequence is determined based on a primitive polynomial of the second sequence.

18. The apparatus according to claim 17, wherein n=14,
the primitive polynomial of the first sequence is $f(x)=1+x^8+x^9+x^{10}+x^{11}+x^{13}+x^{14}$, the initial state of the shift register that generates the first sequence is (1, 1, 1, 1, 1, 1, 1, 1, 1, 1, 1, 1, 1, 1),
the primitive polynomial of the second sequence is $f_1(x)=1+x^4+x^7$,
the primitive polynomial of the fifth sequence is $f_2(x)=1+x+x^7$, and the initial state of the shift register that generates the fifth sequence is (0, 0, 0, 0, 0, 0, 1).

19. The apparatus according to claim 17, wherein n=14,
the primitive polynomial of the first sequence is $f(x)=1+x+x^3+x^5+x^{14}+$, an initial state of a shift register that generates the first sequence is (1, 1, 1, 1, 1, 1, 1, 1, 1, 1, 1, 1, 1, 1),
the primitive polynomial of the second sequence is $f_1(x)=1+x^6+x^7$,
the primitive polynomial of the third sequence is $f_2(x)=1+x^3+x^7$, and the initial state of the shift register that generates the third sequence is (0, 0, 0, 0, 0, 0, 1).

20. A non-transitory computer-readable storage medium storing computer instructions, wherein the computer instructions, when executed by at least one processor of a communication apparatus, cause the communication apparatus to perform:
receiving a navigation reference signal and a communication signal that are of a plurality of cells and that are broadcast by a plurality of network devices, wherein the navigation reference signal comprises a navigation sequence, the navigation sequence is a Kasami sequence determined based on a first sequence and a third sequence, the communication signal comprises a primary synchronization signal and a secondary synchronization signal, and the primary synchronization signal is a sequence determined by performing cyclic shift on a second sequence, wherein the secondary synchronization signal is determined based on a fourth sequence, the fourth sequence is determined based on the second sequence and a fifth sequence, and the fifth sequence and the second sequence are a pair of sequences for forming a Gold sequence, and wherein the first sequence is an n-stage m-sequence, n is a positive even number, the second sequence is an n/2-stage m-sequence obtained by performing cyclic sampling on the first sequence every first interval starting from a position in the first sequence, and the third sequence is an n-stage m-sequence obtained by performing cyclic sampling on the first sequence every second interval starting from a position in the first sequence; and
determining position information of the communications apparatus based on the navigation sequence in the navigation reference signal of at least two cells of the plurality of cells.

\* \* \* \* \*

UNITED STATES PATENT AND TRADEMARK OFFICE
CERTIFICATE OF CORRECTION

PATENT NO. : 12,047,174 B2  
APPLICATION NO. : 18/078810  
DATED : July 23, 2024  
INVENTOR(S) : Wang et al.

Page 1 of 1

It is certified that error appears in the above-identified patent and that said Letters Patent is hereby corrected as shown below:

In the Claims

In Column 29, in Claim 6, Line 25, after "is" delete "a".

In Column 29, in Claim 9, Line 48, delete "$x^{14}+$," and insert -- $x^{14}$, --.

In Column 30, in Claim 13, Line 45, after "of the" delete "first".

In Column 31, in Claim 18, Line 2, delete "f (x)" and insert -- f(x) --.

In Column 31, in Claim 19, Line 12, delete "f (x)" and insert -- f(x) --.

In Column 31, in Claim 19, Line 13, delete "$x^{14}+$," and insert -- $x^{14}$, --.

Signed and Sealed this  
First Day of October, 2024

Katherine Kelly Vidal  
*Director of the United States Patent and Trademark Office*